US012768180B2

(12) United States Patent
Rosenbalm et al.

(10) Patent No.: US 12,768,180 B2
(45) Date of Patent: Oct. 20, 2026

(54) APPARATUS FOR CONTINUOUS ASSEMBLY OF FLOOR OF MANUFACTURED BUILDING

(71) Applicant: CMH Manufacturing, Inc., Maryville, TN (US)

(72) Inventors: Robert Rosenbalm, New Tazewell, TN (US); Ryan Webster, Knoxville, TN (US); Paige Janey, Louisville, TN (US); Zachary Cass, Corryton, TN (US); Tommy Pullin, Clinton, TN (US); Brad Jarrett, Knoxville, TN (US)

(73) Assignee: CMH Manufacturing, Inc., Maryville, TN (US)

( * ) Notice: Subject to any disclaimer, the term of this patent is extended or adjusted under 35 U.S.C. 154(b) by 267 days.

(21) Appl. No.: 18/740,814

(22) Filed: Jun. 12, 2024

(65) Prior Publication Data

US 2025/0382807 A1 Dec. 18, 2025

(51) Int. Cl.

| | |
|---|---|
| ***E04G 21/16*** | (2006.01) |
| ***B27F 7/00*** | (2006.01) |
| ***B27M 3/00*** | (2006.01) |
| ***E04B 5/12*** | (2006.01) |

(52) U.S. Cl.

CPC .............. *E04G 21/16* (2013.01); *B27F 7/003* (2013.01); *B27M 3/0073* (2013.01); *E04B 5/12* (2013.01); *Y10T 29/49623* (2015.01)

(58) Field of Classification Search

CPC ......... E04G 21/166; E04G 21/16; E04B 5/12; Y10T 29/49623; B29P 19/008; B27F 7/006; B27F 7/003; B27M 3/0073

See application file for complete search history.

(56) References Cited

U.S. PATENT DOCUMENTS

| | | | | |
|---|---|---|---|---|
| 3,811,167 | A * | 5/1974 | Schneider | B27M 3/0073 269/305 |
| 6,158,184 | A * | 12/2000 | Timmerman, Sr. | E04B 1/2608 52/712 |
| 7,131,243 | B1 * | 11/2006 | Sirowatka | E04C 3/17 52/645 |
| 7,191,567 | B2 | 3/2007 | Brandt et al. | |
| 7,318,282 | B2 | 1/2008 | Pulte | |
| 7,707,799 | B2 | 5/2010 | Wrass et al. | |
| 7,832,087 | B2 | 11/2010 | Gilgan et al. | |
| 7,832,155 | B1 | 11/2010 | Shea | |
| 8,185,240 | B2 | 5/2012 | Williams et al. | |
| 8,281,532 | B2 | 10/2012 | Pulte et al. | |
| 8,978,319 | B2 | 3/2015 | Patino | |
| 10,184,241 | B2 * | 1/2019 | Johnson | E04B 1/10 |
| 10,442,041 | B2 * | 10/2019 | Whitfield, Sr | B23P 19/004 |

(Continued)

*Primary Examiner* — Andrew J Triggs

(74) *Attorney, Agent, or Firm* — Luedeka Neely, P.C.

(57) ABSTRACT

A system is described that assembles a floor for a manufactured building in a continuous fashion. Unlike current methods in which framing and decking members are carried manually along a jig or table to the point of installation, the system includes an automated conveyance apparatus that moves material through various stations where floor components are assembled at a continuous preprogrammed rate. Key aspects of the system include continuous assembly, automated material conveyance, automated gang nailing, and automated part location marking.

7 Claims, 18 Drawing Sheets

(56) References Cited

U.S. PATENT DOCUMENTS

| | | | | |
|---|---|---|---|---|
| 11,905,752 | B2 * | 2/2024 | Dittrich | B23P 21/004 |
| 12,365,110 | B2 * | 7/2025 | Kanjee | B25J 9/026 |
| 2011/0302877 | A1 | 12/2011 | Gilgan et al. | |

* cited by examiner

APPARATUS FOR CONTINUOUS ASSEMBLY OF FLOOR OF MANUFACTURED BUILDING

FIELD

This invention relates to the field of manufactured buildings. More particularly, this invention relates to an apparatus that implements a continuous process for assembling the floor of a manufactured building.

BACKGROUND

Manufactured building construction processes and equipment have not changed substantially in several decades. Remotely operated hoists and pneumatic nail guns still largely represent the state of the art. Current processes for assembling the floor of a manufactured building rely heavily on human labor to pick, transport, and place materials along the full length of the floor. These processes are time-consuming and not ergonomically advantageous, and they require a high level of strength and physical fitness of the personnel involved. As a result, these processes have inherent limits on the production level that can be achieved based on the physical limitations of personnel that are building the buildings.

What is needed, therefore, is an automated system that largely replaces many of the assembly operations that have been performed by human laborers.

SUMMARY

The above and other needs are met by an apparatus and process for assembling floors for manufactured buildings in a continuous fashion. Unlike current methods in which framing and decking members are carried manually along a jig or table to the point of installation, the system described herein uses automated conveyance systems to move material through set stations where components are assembled. The system implements a continuous assembly process in which the floor is assembled at a preprogrammed steady rate. The system is controlled with a programmable logic controller (PLC) that uses an industrial grade computer to convert floor plans from a spreadsheet into a format that the PLC can interpret. As described in further detail hereinafter, key aspects of the system include continuous assembly, automated material conveyance, automated gang nailing, and automated part location marking.

Embodiments described herein are directed to an apparatus for use in assembling a floor of a manufactured building using rim joist boards and floor joist boards as the floor moves in a first direction. In a preferred embodiment, the apparatus includes a perimeter rail transport system, a gang nailing system, a printer system, a floor joist board transport system, a floor joist board attachment operator station, a floor decking operator station, and a controller.

The perimeter rail transport system includes first and second perimeter rail transporters. The first perimeter rail transporter is configured to receive a first set of the rim joist boards, to abut the rim joist boards of the first set together in an end-to-end configuration, and to transport the abutted first set of rim joist boards in the first direction. The second perimeter rail transporter is configured to receive a second set of the rim joist boards, to abut the rim joist boards of the second set together in an end-to-end configuration, and to transport the abutted second set of rim joist boards in the first direction. The first set of abutted rim joist boards is disposed in parallel to and spaced apart from the second set of abutted rim joist boards.

The gang nailing system includes first and second gang nailers. The first gang nailer is configured to receive the first set of abutted rim joist boards as they move in the first direction and to drive gang nail plates into the boards in locations at which the boards are abutted together, thereby attaching the first set of rim joist boards together to form a first perimeter rail. The second gang nailer is configured to receive the second set of abutted rim joist boards as they move in the first direction and to drive gang nail plates into the boards in locations at which the boards are abutted together, thereby attaching the second set of rim joist boards together to form a second perimeter rail.

The printer system includes first and second printer assemblies. The first printer assembly is configured to print location indicator markings on the first perimeter rail, which are separated by predetermined spacings from adjacent location indicator markings. The second printer assembly is configured to print location indicator markings on the second perimeter rail, which are separated by predetermined spacings from adjacent location indicator markings.

The floor joist board transport system is configured to transport a plurality of floor joist boards in the first direction, wherein the floor joist boards are disposed side-by-side and oriented lengthwise in a second direction that is substantially perpendicular to the first direction.

The floor joist board attachment operator station receives the floor joist boards and the first and second perimeter rails. The floor joist board attachment operator station includes a first fastener insertion tool for inserting fasteners to attach first ends of the floor joist boards to the first perimeter rail, and a second fastener insertion tool for inserting fasteners to attach second ends of the floor joist boards to the second perimeter rail. The floor joist board attachment operator station also includes a first area for accommodating a first fastener operator who uses the first fastener insertion tool to insert the fasteners to attach the first ends of the floor joist boards orthogonally to the first perimeter rail in locations indicated by the location indicator markings printed on the first perimeter rail. The first area is adjacent to the first perimeter rail and the first ends of the floor joist boards as they are delivered by the one or more conveyors to the floor joist board attachment operator station. The floor joist board attachment operator station also includes a second area for accommodating a second fastener operator who uses the second fastener insertion tool to insert the fasteners to attach the second ends of the floor joist boards orthogonally to the second perimeter rail in locations indicated by the location indicator markings printed on the second perimeter rail. The second area is adjacent to the second perimeter rail and the second ends of the floor joist boards as they are delivered by the one or more conveyors to the floor joist board attachment operator station.

The floor decking operator station receives the first and second perimeter rails with the floor joist boards attached therebetween. The floor decking operator station includes a third area for accommodating one or more decking operators as they attach flooring sheets in a predetermined pattern to upper surfaces of the first and second perimeter rails and to the floor joist boards attached therebetween.

The controller executes instructions to control one or more of the perimeter rail transport system, the gang nailing system, the printer system, and the floor joist board transport system.

In some embodiments, the first perimeter rail transporter includes a first roller bracket aligned in the first direction, a second roller bracket aligned in parallel with the first roller bracket, and first arms attached to the second roller bracket. A first pusher motor drives the first arms to cause the second roller bracket to move toward or away from the first roller bracket in the second direction, thereby controlling the width of a first space between the first and second roller brackets that receives the first set of the rim joist boards. A first roller, which is disposed above the first space, is operable to translate downward to engage a rim joist board in the first space. A first rail drive motor, which is connected to the first roller, causes the first roller to rotate. Rotation of the first roller when engaged with the rim joist board causes the rim joist board to move in the first direction between the first and second roller brackets.

In some embodiments, the second perimeter rail transporter includes a third roller bracket aligned in the first direction, a fourth roller bracket aligned in parallel with the third roller bracket, and second arms attached to the fourth roller bracket. A second pusher motor drives the second arms to cause the fourth roller bracket to move toward or away from the third roller bracket in the second direction, thereby controlling the width of a second space between the third and fourth roller brackets that receives the second set of the rim joist boards. A second roller, which is disposed above the second space, is operable to translate downward to engage a rim joist board in the second space. A second rail drive motor, which is connected to the second roller, causes the second roller to rotate. Rotation of the second roller when engaged with the rim joist board causes the rim joist board to move in the first direction between the third and fourth roller brackets.

In some embodiments, the perimeter rail transport system includes first and second perimeter rail detection sensors. The first perimeter rail detection sensor generates a first perimeter rail detection sensor signal indicating whether a rim joist board is detected beneath the first roller, and the second perimeter rail detection sensor generates a second perimeter rail detection sensor signal indicating whether a rim joist board is detected beneath the second roller. The controller in these embodiments is further operable to:

- receive the first perimeter rail detection sensor signal indicating that no rim joist board is detected beneath the first roller, and generate a first pusher motor control signal based thereon to cause the first pusher motor to drive the first arms to cause the second roller bracket to push a rim joist board in the first space against the first roller bracket and beneath the first roller;
- receive the first perimeter rail detection sensor signal indicating that a rim joist is detected beneath the first roller, and generate a first roller control signal based thereon to cause the first roller to translate downward to engage the rim joist board detected beneath the first roller, thereby causing the rim joist board to move in the first direction;
- receive the second perimeter rail detection sensor signal indicating that no rim joist board is detected beneath the second roller, and generate a second pusher motor control signal based thereon to cause the second pusher motor to drive the second arms to cause the fourth roller bracket to push a rim joist board in the second space against the third roller bracket and beneath the second roller; and
- receive the second perimeter rail detection sensor signal indicating that a rim joist board is detected beneath the second roller, and generate a second roller control signal based thereon to cause the second roller to translate downward to engage the rim joist board detected beneath the second roller, thereby causing the rim joist board to move in the first direction.

In some embodiments, the apparatus includes first and second main encoders. The first main encoder generates first pulses used in monitoring positions of the rim joist boards from the first set as the rim joist boards move in the first direction. The second main encoder generates second pulses used in monitoring positions of the rim joist boards from the second set as the rim joist boards move in the first direction. In these embodiments, the controller is further operable to:

- receive the first perimeter rail detection sensor signal indicating that a trailing edge of a rim joist board has passed beneath the first perimeter rail detection sensor;
- receive the second perimeter rail detection sensor signal indicating that a trailing edge of a rim joist board has passed beneath the second perimeter rail detection sensor;
- count the first pulses from the first main encoder received after the trailing edge of the rim joist board from the first set has passed beneath the first perimeter rail detection sensor;
- based on counting a first predetermined number of first pulses, control the first roller to move upward, and generate a first pusher motor control signal to cause the first pusher motor to drive the first arms to cause the second roller bracket to push another rim joist board from the first set against the first roller bracket and beneath the first roller;
- count the second pulses from the second main encoder received after the trailing edge of the rim joist board from the second set has passed beneath the second perimeter rail detection sensor; and
- based on counting a first predetermined number of second pulses, control the second roller to move upward, and generate a second pusher motor control signal to cause the second pusher motor to drive the second arms to cause the fourth roller bracket to push another rim joist board from the second set against the third roller bracket and beneath the second roller.

In some embodiments, the gang nailing system includes a first and second horizontal transport carriages aligned in the first direction. A first transport carriage motor is configured to drive the first horizontal transport carriage, and a second transport carriage motor is configured to drive the second horizontal transport carriage. The first gang nailer includes a first gang nail press suspended below the first horizontal transport carriage, and the second gang nailer includes a second gang nail press suspended below the second horizontal transport carriage. The controller in these embodiments is further operable to:

- based on counting a first predetermined number of first pulses from the first main encoder, control the first transport carriage motor to move the first transport carriage with the first gang nail press in the first direction at the same speed at which two abutted rim joist boards from the first set are moving, so that an abutment point between the two abutted rim joist boards remains centered between two opposing plates of the first gang nail press;
- based on counting a second predetermined number of second pulses from the second main encoder, control the second transport carriage motor to move the second transport carriage with the second gang nail press in the first direction at the same speed at which two abutted rim joist boards from the second set are moving, so that an abutment point between the two abutted rim joist boards remains centered between two opposing plates of the second gang nail press;

while the first gang nail press moves in the first direction at the same speed at which the two abutted rim joist boards from the first set are moving, control a first press activator to cause the opposing plates of the first press to clamp down against the two abutted rim joist boards from the first set and drive in gang nails on either side thereof to form a portion of the first perimeter rail; and while the second gang nail press moves in the first direction at the same speed at which the two abutted rim joist boards from the second set are moving, control a second press activator to cause the opposing plates of the second press to clamp down against the two abutted rim joist boards from the second set and drive in gang nails on either side thereof to form a portion of the second perimeter rail.

In some embodiments, the first printer assembly includes a first vertical transport carriage, a first ink jet printer attached to the first vertical transport carriage, and a first leading edge detection sensor operable to detect a leading edge of the first perimeter rail and generate a first leading edge sensor signal based thereon. Similarly, the second printer assembly includes a second vertical transport carriage, a second ink jet printer attached to the second vertical transport carriage, and a second leading edge detection sensor operable to detect a leading edge of the second perimeter rail and generate a second leading edge sensor signal based thereon. The controller in these embodiments is further operable to:

receive the first leading edge sensor signal indicating detection of the leading edge of the first perimeter rail;

receive the second leading edge sensor signal indicating detection of the leading edge of the second perimeter rail;

control the first vertical transport carriage to move the first ink jet printer to an appropriate height above a top surface of the first perimeter rail;

control the second vertical transport carriage to move the second ink jet printer to an appropriate height above a top surface of the second perimeter rail;

based on the first leading edge sensor signal and the first pulses from the first main encoder, control the first ink jet printer to print location indicator markings on the top surface of the first perimeter rail at the predetermined spacings as it moves in the first direction beneath the first ink jet printer; and based on the second leading edge sensor signal and the second pulses from the second main encoder, control the second ink jet printer to print location indicator markings on the top surface of the second perimeter rail at the predetermined spacings as it moves in the first direction beneath the second ink jet printer.

In some embodiments, the floor joist board transport system includes a floor joist board supply rack configured to accommodate a bundle of floor joist boards. A vacuum transport gantry is disposed above the floor joist board supply rack. Vacuum lifts, which are suspended from the vacuum transport gantry, are configured to lift floor joist boards from the floor joist board supply rack. A vacuum pump is configured to provide a vacuum to the vacuum lifts. One or more gantry detection sensors are attached to the vacuum transport gantry that detect floor joist boards that have been lifted by the one or more vacuum lifts. One or more gantry motors are configured to move the gantry. Floor joist conveyors are configured to receive floor joist boards from the vacuum lifts and transport the floor joist boards in the first direction. The floor joist conveyors have an unloading area that is configured to receive the floor joist boards in a side-by-side arrangement, with each of the floor joist boards oriented lengthwise in the second direction. One or more floor joist conveyor motors are configured to drive the floor joist conveyors. One or more floor joist conveyor detection sensors are configured to detect floor joist boards in the unloading area on the floor joist conveyors. A floor joist chute, which is disposed at a forward end of the floor joist conveyors, is configured to sequentially receive the floor joist boards one at a time as they are moved in the first direction by the floor joist conveyors. One or more floor joist chute detection sensors, which are attached to the floor joist chute, generate one or more sensor signals indicating whether a floor joist board is present in the floor joist chute. The controller of these embodiments is further operable to:

receive sensor signals from the one or more gantry detection sensors indicating whether any floor joist boards are engaged with the vacuum lifts;

based on detecting no floor joist boards engaged with the vacuum lifts, control the one or more gantry motors to horizontally translate the vacuum transport gantry into a loading position above the floor joist board supply rack, and control the one or more gantry motors to lower the vacuum lifts downward to engage a top layer of the floor joist boards in the bundle;

control the one or more gantry motors to lift the vacuum lifts with the top layer of floor joist boards attached thereto and horizontally translate the vacuum transport gantry into a position above the unloading area of the floor joist conveyors;

receive sensor signals from the one or more floor joist conveyor detection sensors indicating whether floor joist boards are present in the unloading area of the floor joist conveyors;

based on detecting no floor joist boards in the unloading area, control the one or more gantry motors to lower the vacuum lifts downward until the floor joist boards contact the floor joist conveyors, and control the vacuum pump to release the vacuum to deposit the floor joist boards onto the unloading area;

based on detecting one or more floor joist boards in the unloading area, control the one or more gantry motors to hold position until no floor joist boards are detected in the unloading area;

based on detecting no floor joist boards in the floor joist chute, control the one or more floor joist conveyor motors to drive the floor joist conveyors to deposit a floor joist board into the floor joist chute; and based on detecting a floor joist board in the floor joist chute, control the one or more floor joist conveyor motors to stop driving the floor joist conveyors.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
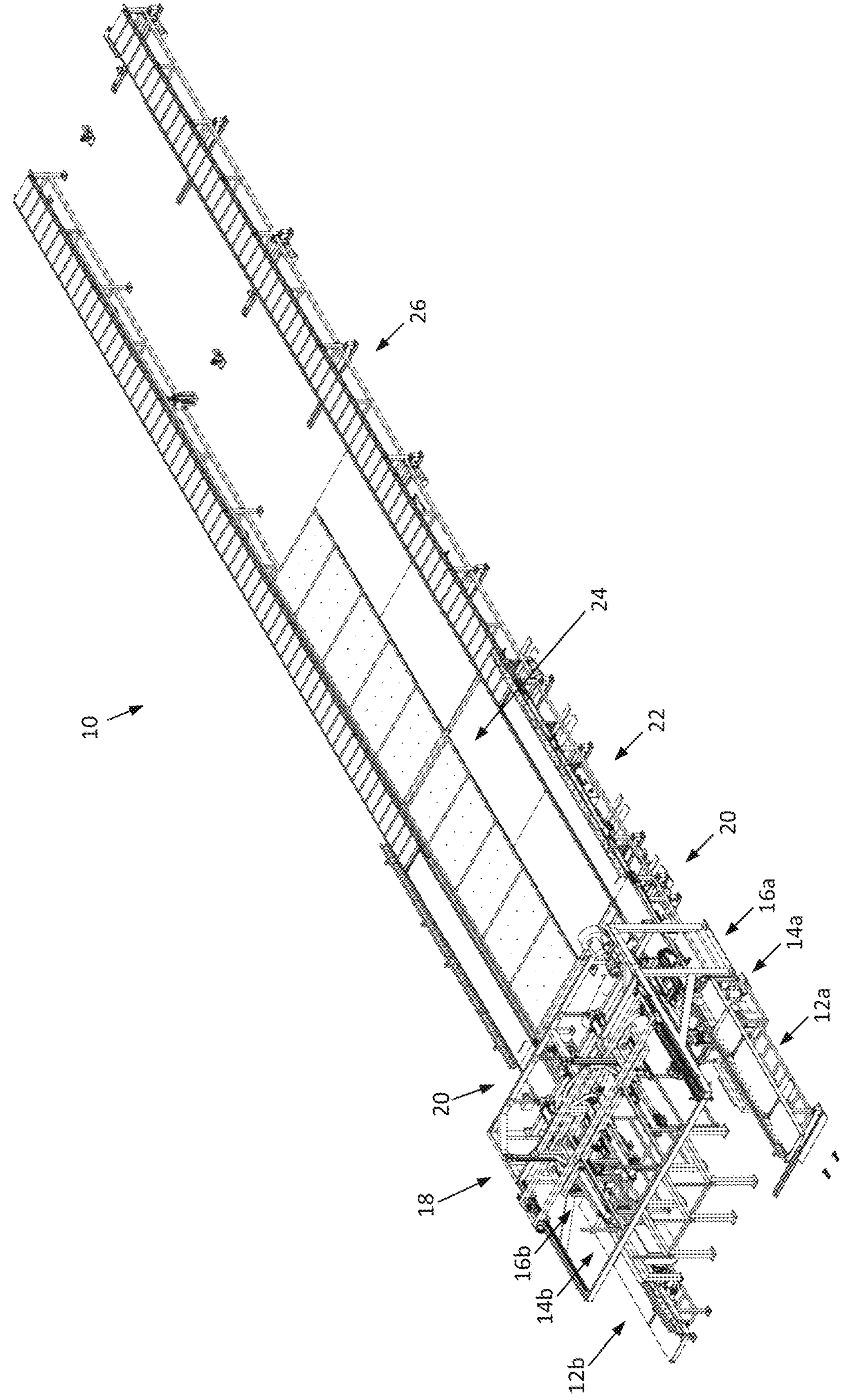
FIG. 1 depicts the physical layout of an apparatus for use in assembling a floor of a manufactured building according to an embodiment of the invention.

As depicted in FIG. 1, described herein is a continuous assembly table (CAT) 10 for use in a process of assembling the floor of a manufactured building. In preferred embodiments, the CAT can accommodate floors ranging in width from 12 feet to 16 feet and in length from 40 to 80 feet, although it will be appreciated that embodiments of the CAT 10 can accommodate floors of any length. The major subsystems of the CAT 10 include a perimeter rail transport system 12, a gang nailing system 14, a printer system 16, a floor joist board transport system 18, a joist nailing operator station 20, an assembled floor transport system 22, a floor decking operator station 24, and a finished floor lifting system 26. Other subsystems include a table width adjustment system 100 (FIG. 19) and a table height adjustment system 102 and 104 (FIGS. 20A-20B).

Figure 2A:
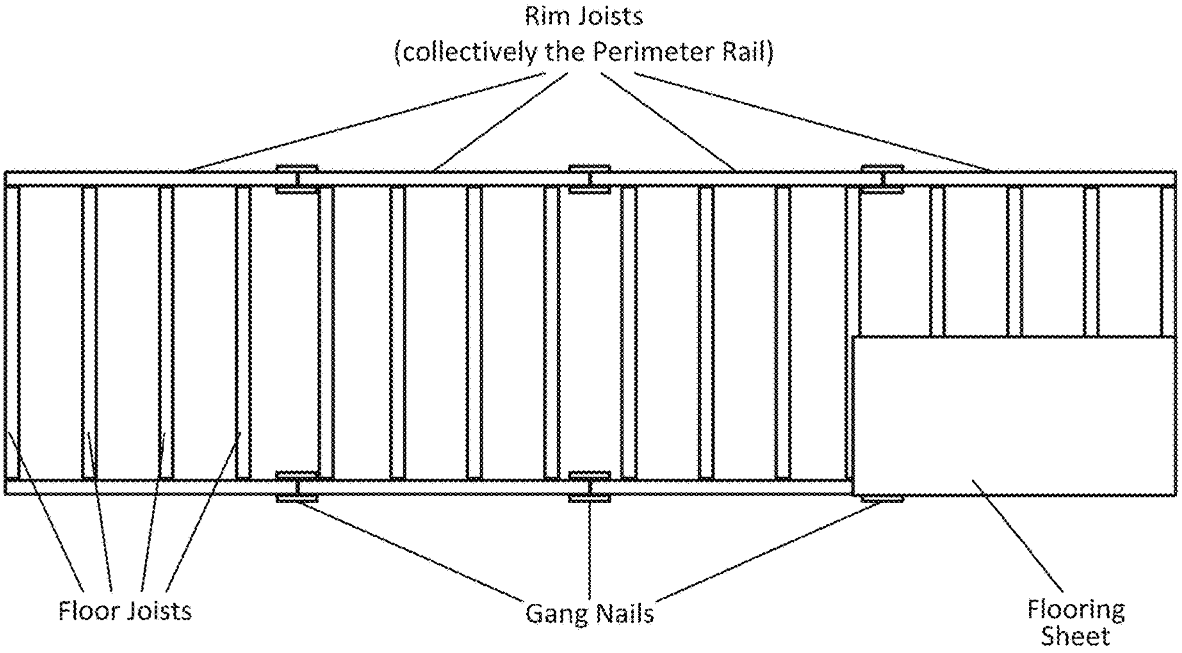
FIGS. 2A and 2B are top and side views, respectively, of an assembled floor of a manufactured building.
Figure 2B:
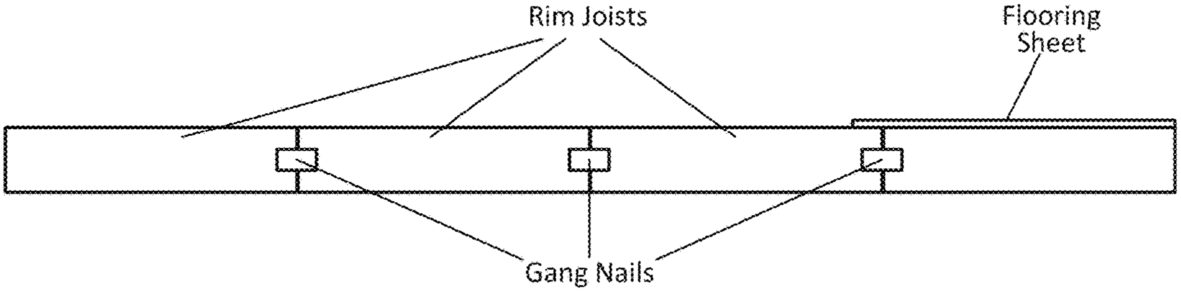

As shown in FIGS. 2A and 2B, the floor assembled using the CAT 10 is a standard rectangular box-like structure, the length of which is defined by a pair of perimeter rails and the width of which is defined by floor joist boards that are disposed between and perpendicular to the perimeter rails. Each of the perimeter rails comprises multiple rim joists that are attached together end-to-end using gang nails as described in more detail hereinafter. The floor joist boards are generally spaced apart from each other by about 16 inches, although other spacings may be used. The ends of the floor joist boards are attached to the inner surfaces of the perimeter rails by fasteners, such as nails, that are driven through the perimeter rails into the ends of the floor joist boards. Flooring sheets (one of which is shown in FIGS. 2A and 2B), such as plywood panels, are fastened to the tops of the perimeter rails and floor joist boards to form the top surface of the floor.

Figure 3:
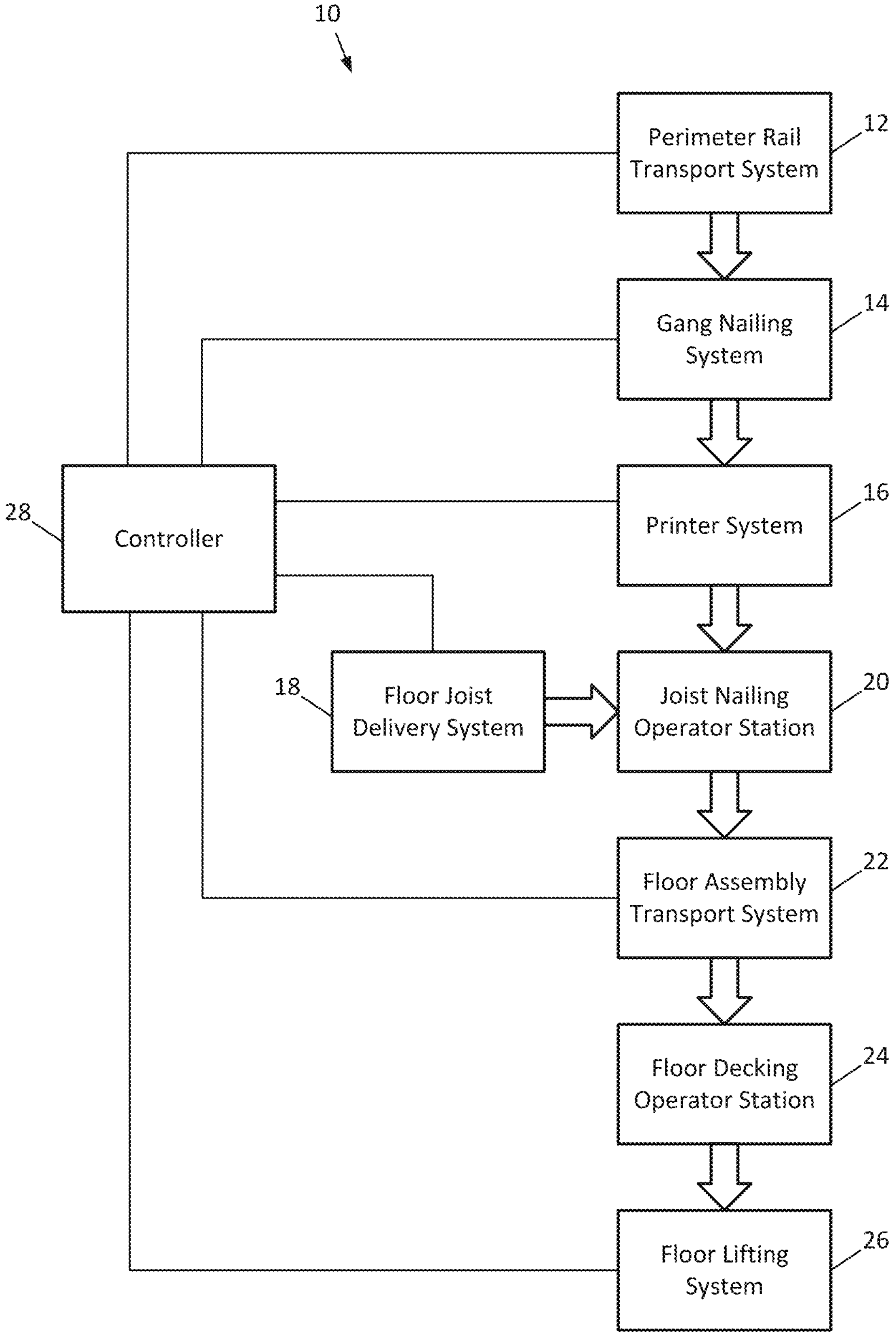
FIG. 3 depicts a functional block diagram of an apparatus for use in assembling a floor of a manufactured building according to an embodiment of the invention.
Figure 4A:
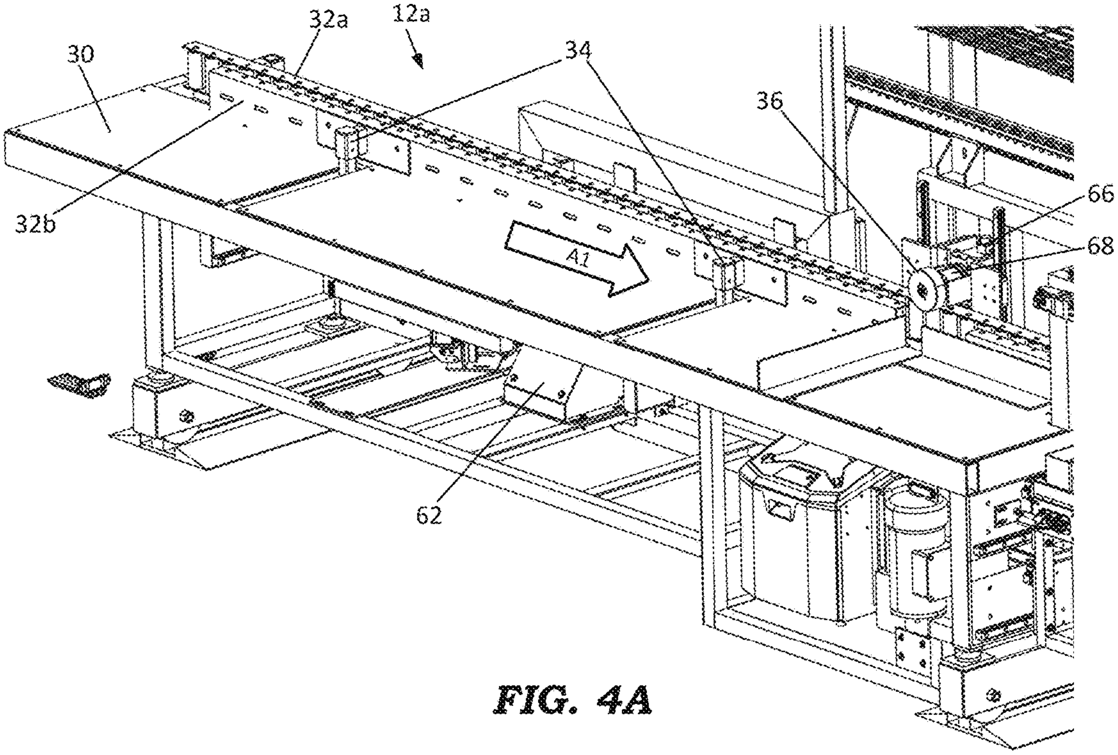
FIGS. 4A and 4B depict a perimeter rail transport system of the apparatus of FIG. 1 according to an embodiment of the invention.
Figure 4B:
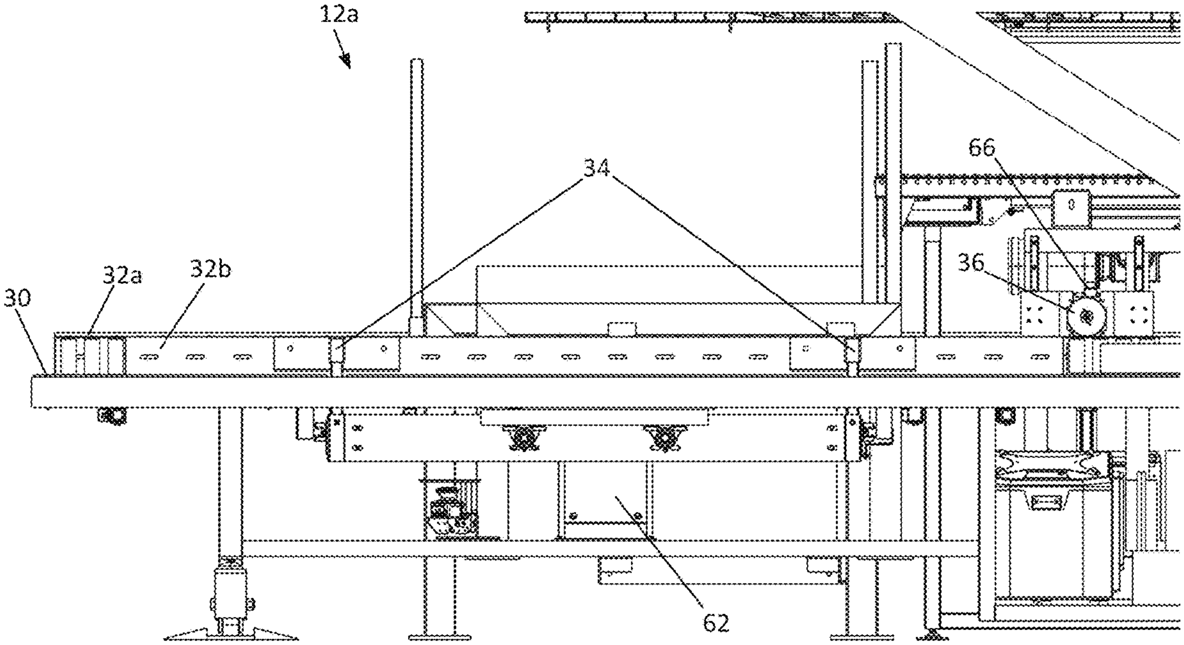
Figure 23:
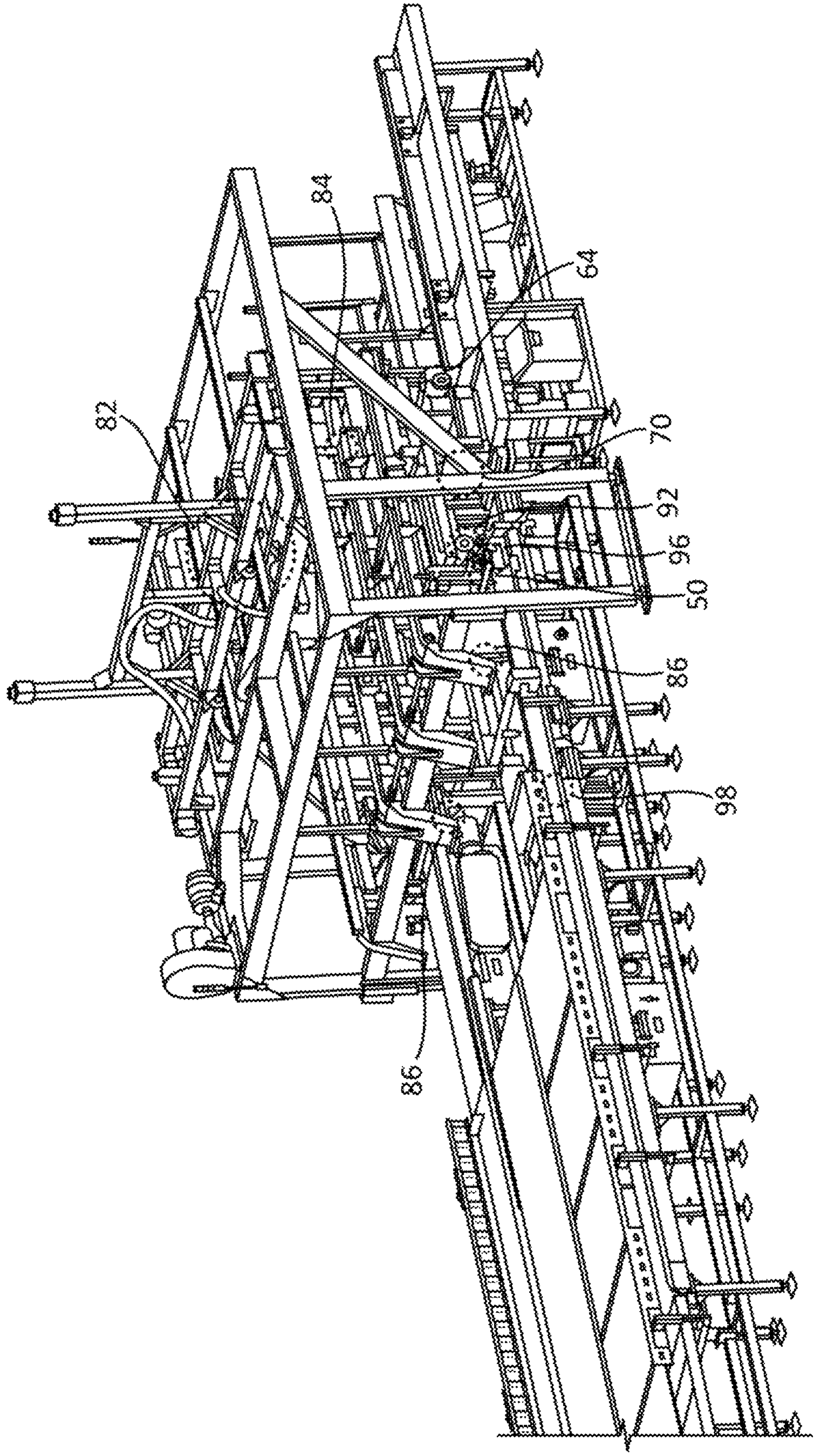
FIG. 23 depicts locations of various sensors of the apparatus of FIG. 1 according to an embodiment of the invention.

FIG. 3 depicts a functional block diagram of the CAT 10 and the overall process flow for its use in the continuous assembly of a floor. The process is controlled by a computer, such as a programmable logic controller (PLC), that is also referred to herein as the controller 28. As described in more detail in the following sections, the controller 28 receives sensor signals from sensors embedded in the various subsystems and provides control signals to components of the subsystems as flooring materials continuously move through the assembly process. FIG. 23 depicts locations of the various sensors discussed hereinafter.

Perimeter Rail Transport System

As shown in FIGS. 4A-4B, 5A-5D and 14, the perimeter rail transport system 12 feeds rim joists into the gang nailing system 14 in an end-to-end orientation. The perimeter rail transport system 12 comprises two substantially identical subsystems—referred to herein as the perimeter rail transporters 12*a* and 12*b*—operating on opposing sides of the CAT 10. Unless noted otherwise, the perimeter rail transporters 12*a* and 12*b* both include substantially all of the same components. FIGS. 4A-4B and 5A-5D depict the components of the perimeter rail transporter 12*a*, which is described in detail hereinafter. The description of the perimeter rail transporter 12*a* applies as well to the opposing perimeter rail transporter 12*b*.

A set of rim joists are manually loaded side-by-side onto the conveyor top plate 30 between the roller brackets 32*a* and 32*b*. Preferably, the roller bracket 32*b* can be moved toward or away from the bracket 32*a* based on translation of the arms 34 extending through the top plate 30. This allows for adjustment of the spacing between the roller brackets 32*a*-32*b* which determines how many rim joists can be accommodated for a particular floor design. In a preferred embodiment, the arms 34 are driven by a pusher motor 62 disposed beneath the top plate 30.

Once the system has been activated, such as by an operator pressing a start button on a control panel, a perimeter rail detection sensor 64 provides a signal to the controller 28 indicting whether a rim joist is present directly beneath a roller 36. If no rim joist is detected, the controller

28 activates the pusher motor 62 to drive the arms 34 to push the innermost joist into position under the roller 36. Once the joist is detected by the sensor 64, the controller 28 activates a rail feed cylinder 66 to cause the roller 36 to be translated downward to engage the top surface of the joist. A rail drive motor 68 rotates the roller 36, thereby causing the innermost rim joist to move in the direction indicated by the arrow A1. Once the trailing edge of the joist is detected by the perimeter rail detection sensor 64, the controller 28 counts pulses from the main encoder 96. Once a predetermined number of counts is reached after detection of the trailing edge, the controller 28 controls the rail feed cylinder 66 to cause the roller 36 to be translated upward, and controls the pusher motor 62 to push the next innermost joist into position under the roller 36, and the process repeats.

Figure 5A:
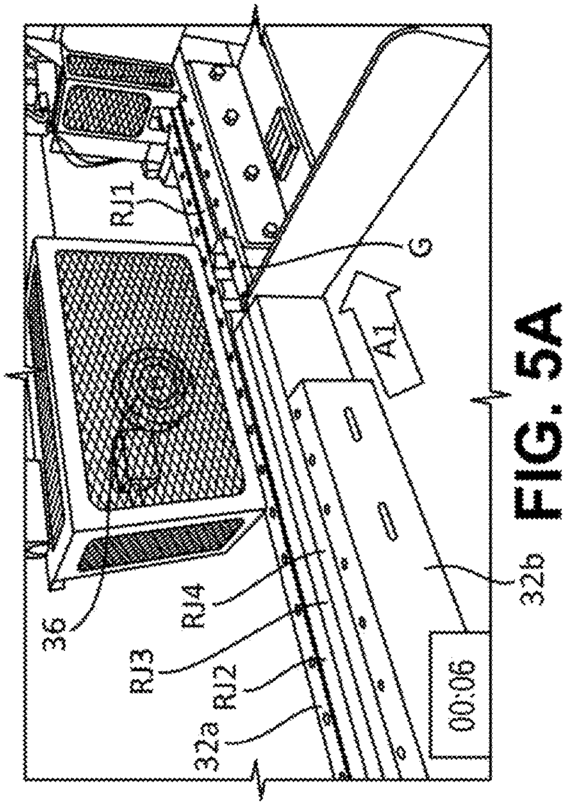
FIGS. 5A, 5B, 5C and 5D depict the perimeter rail transport system in operation according to an embodiment of the invention.
Figure 5B:
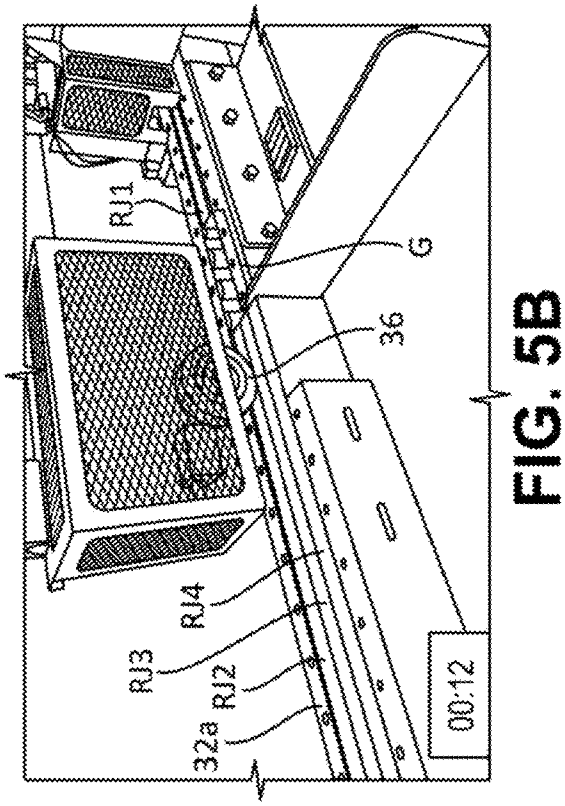
Figure 5C:
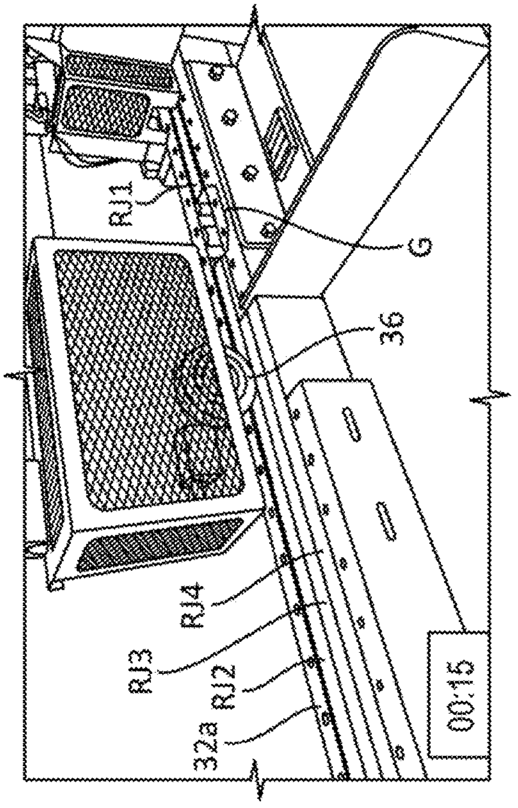
Figure 5D:
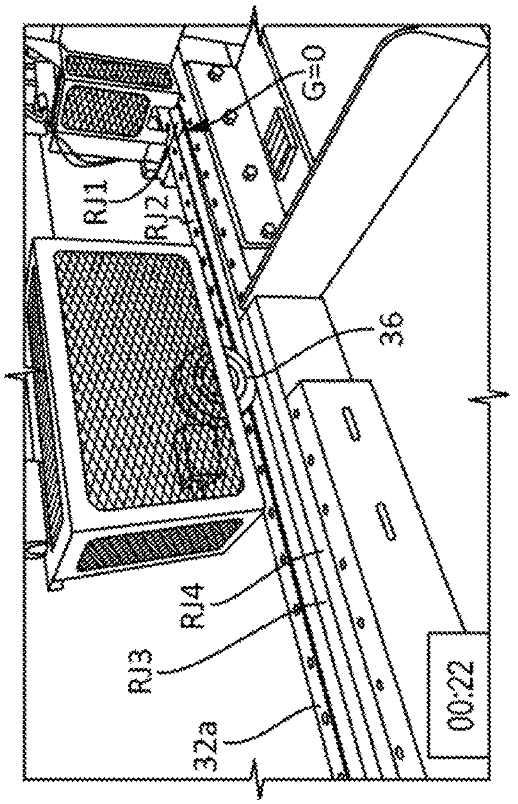
Figure 6A:
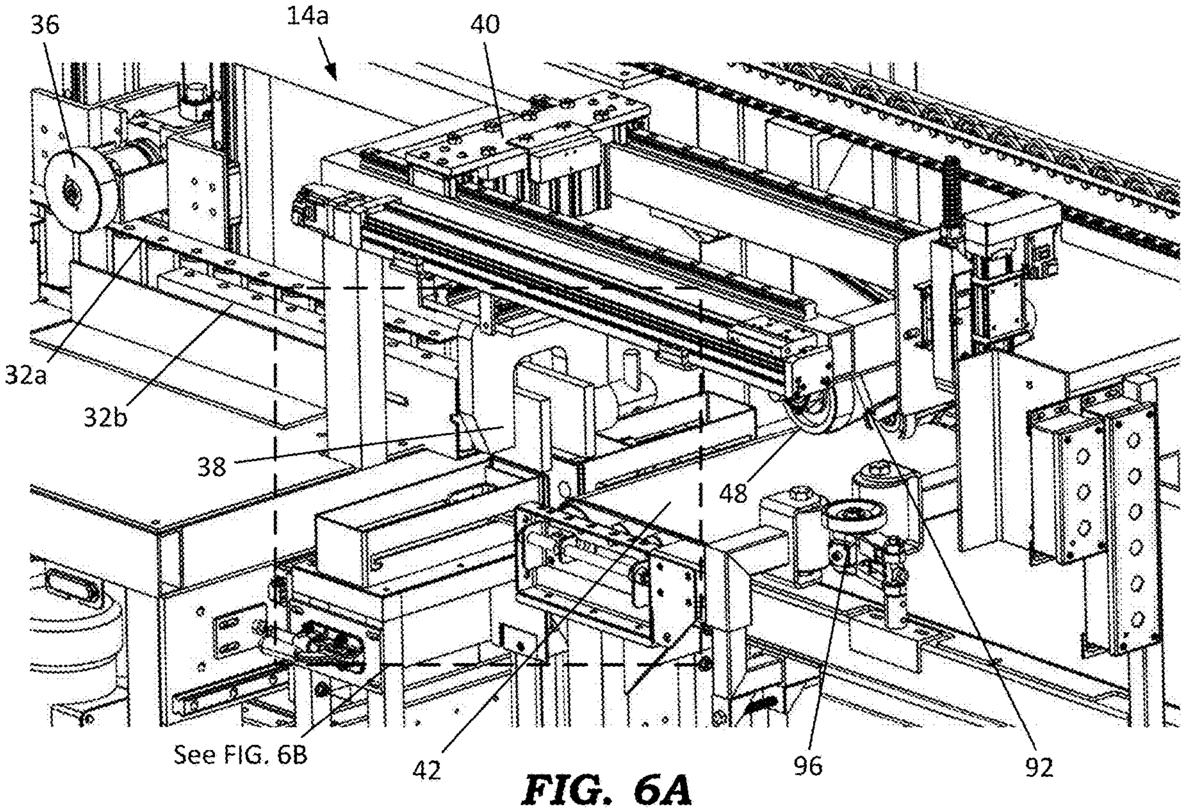
FIGS. 6A and 6B depict a gang nailing system of the apparatus of FIG. 1 according to an embodiment of the invention.
Figure 6B:
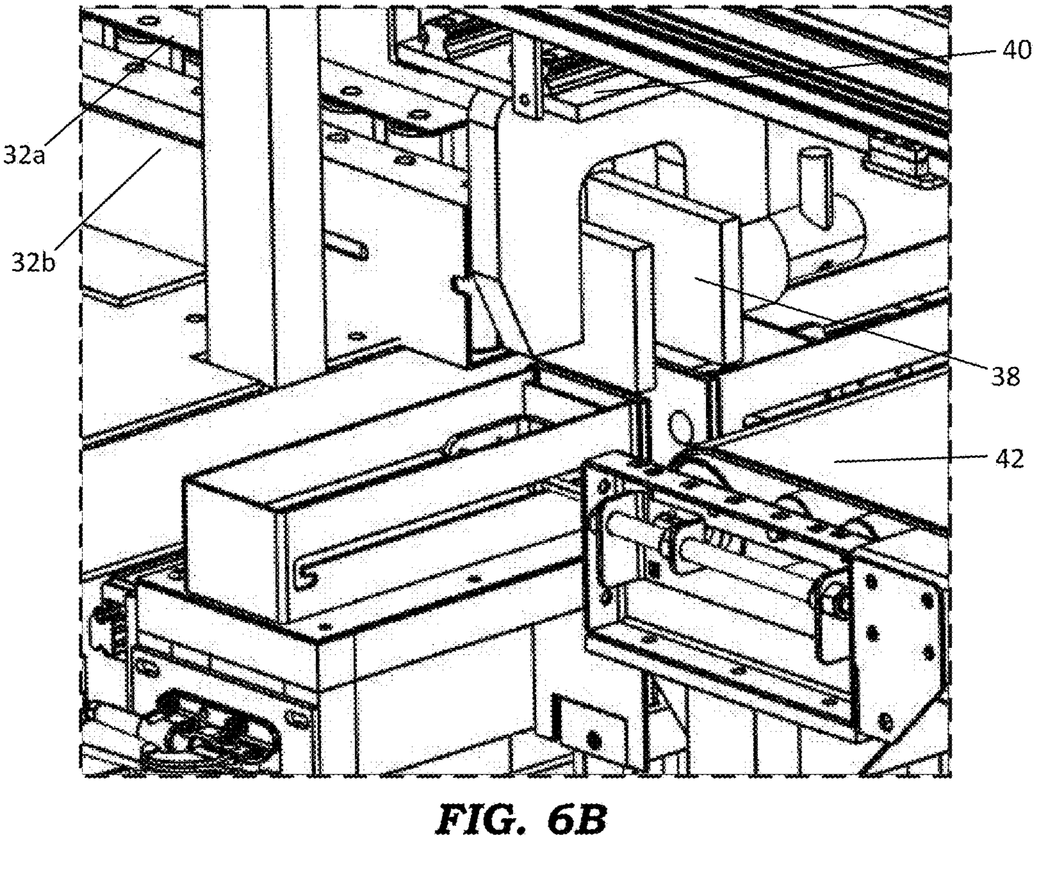
Figure 8A:
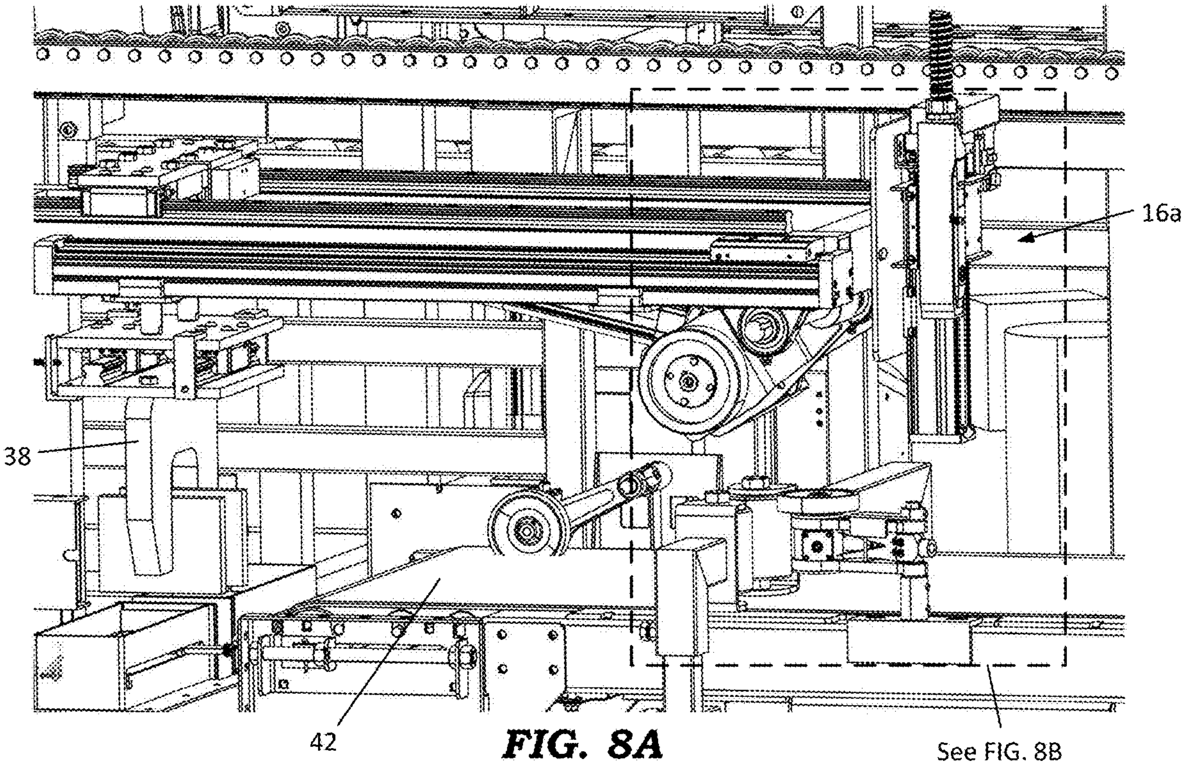
FIGS. 8A and 8B depict a printer system of the apparatus of FIG. 1 according to an embodiment of the invention.
Figure 8B:
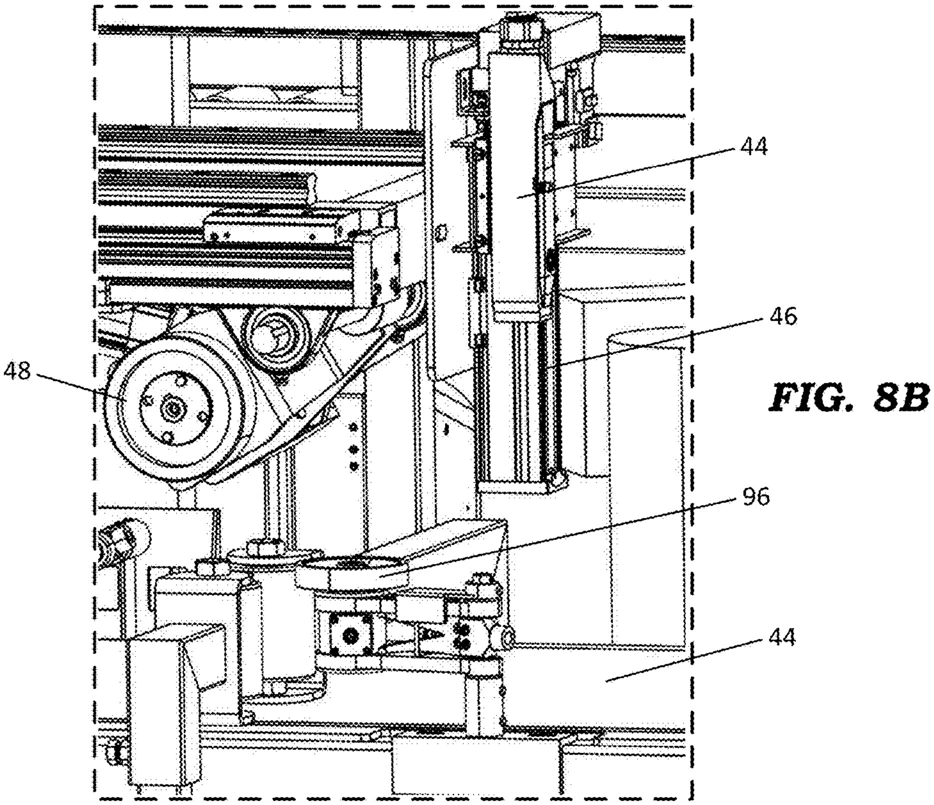

FIG. 5A shows three rim joists (RJ2, RJ3 and RJ4) between the brackets 32*a* and 32*b* and a rim joist RJ1 that has already moved beyond the roller 36 and is being conveyed downstream by a belt 42 and conveyor roller 48 driven by the main drive motor 92 and (shown in FIGS. 8A and 8B). It should be noted that at elapsed time 00:06 seconds after the beginning of the process (indicated by the label in FIG. 5A), the roller 36 has not yet translated downward to engage the joist RJ2. In FIG. 5B, the roller 36 has engaged the joist RJ2 and moved it toward the joist RJ1, thereby beginning to close the gap G between the two at elapsed time 00:12 seconds. FIGS. 5C and 5D show the joist RJ2 catching up with joist RJ1 until the gap G is closed at elapsed time 00:22 seconds. This sequence repeats for joists RJ3 and RJ4 as the process continues.

Gang Nailing System

As shown in FIGS. 6A-6B, 7A-7D and 15, the gang nailing system 14 receives the rim joists as they move through and beyond the perimeter rail transport system 12. The gang nailing system 14 comprises two substantially identical subsystems—referred to herein as the gang nailers 14*a* and 14*b*—operating on opposing sides of the CAT 10. Unless noted otherwise, the gang nailers 14*a* and 14*b* both include substantially all of the same components. FIGS. 6A-6B and 7A-7D depict the components of the gang nailer 14*a,* which is described in detail hereinafter. The description of the gang nailer 14*a* applies as well to the opposing gang nailer 14*b*.

Figure 7A:
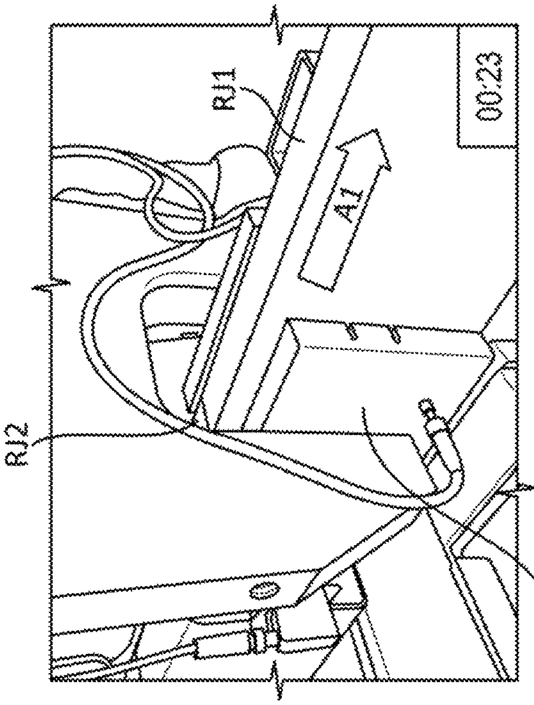
FIGS. 7A, 7B, 7C and 7D depict the gang nailing system in operation according to an embodiment of the invention.
Figure 7B:
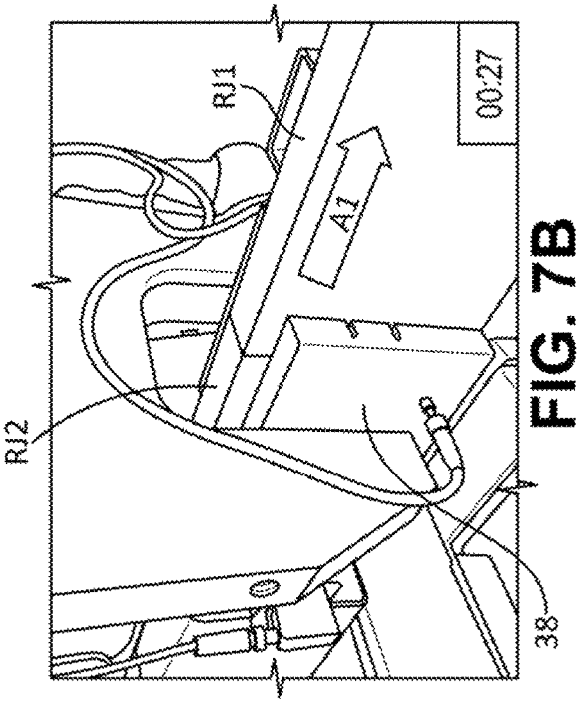
Figure 7C:
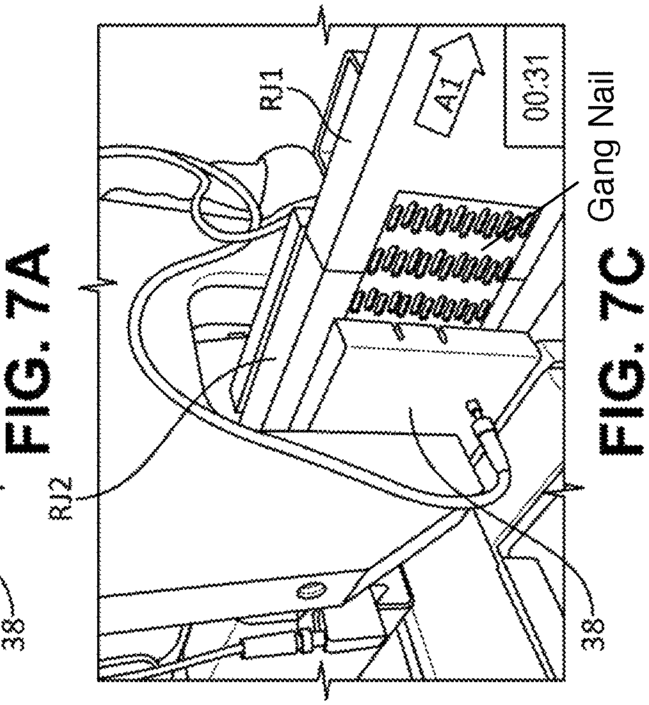
Figure 7D:
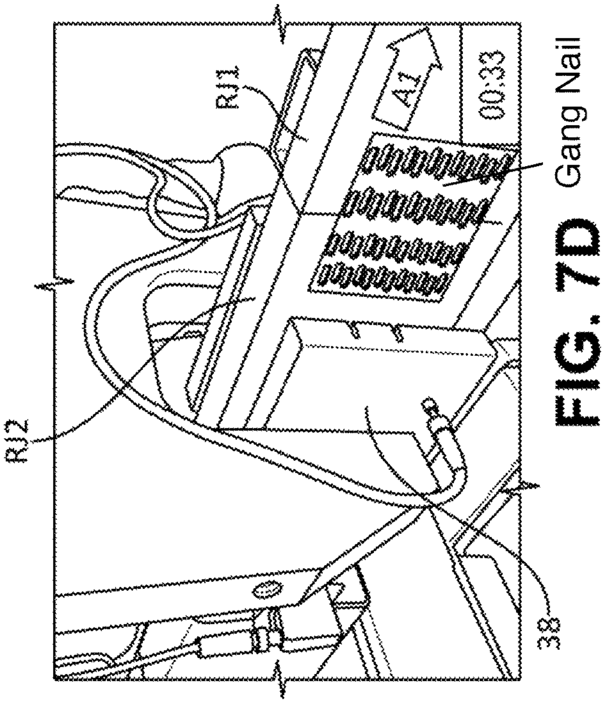

The gang nailer 14*a* includes a gang nail press 38 suspended below a horizontal transport carriage 40. The press 38 is supplied with gang nail plates by a pneumatic cylinder attached below the press 38. In the preferred embodiment, the metal gang nail plates are held in place on the press 38 with rare earth magnets. Just forward of the press 38 is the conveyor belt 42 and roller 48. As each rim joist moves between the opposing plates of the gang nail press 38, the leading edge of the joist engages the roller 48 and maintains forward motion, and the abutment point between the ends of the joists RJ1 and RJ2 moves between the plates of the gang nail press 38 as shown in FIG. 7A. Based on a signal from the perimeter rail detection sensor 64, the controller 28 begins counting pulses from the main encoder 96. At a predetermined pulse count, the controller 28 controls a transport carriage motor 74 to move the transport carriage 40 with the press 38 forward at the same speed as the joists so that the abutment point is centered between the plates. As the press 38 and the joists RJ1 and RJ2 continue to move forward, the controller 28 controls a press activator 76 to cause the plates of the press 38 clamp down against the joists and to drive in the gang nail plates on either side of the joists, as shown in FIG. 7B and 7C. The press 38 then opens the plates and moves back to its home position as the joined joists continue moving forward, as shown in FIG. 7D. This process is repeated to apply gang nails at the abutments of joist RJ2 to joist RJ3 and joist RJ3 to joist RJ4 to form the perimeter rail, all while the joists are in continuous motion in the direction of the arrow A1. Preferred embodiments of the system include a nail plate detection sensor 70 that provides an indication signal to the controller 28 when the supply of gang nail plates needs to be replenished.

Printer System

As shown in FIGS. 8A, 8B, 9A-9C and 16, as the perimeter rails are conveyed beyond the gang nailing system 14, they move beneath the printer system 16. The printer system 16 comprises two substantially identical subsystems—referred to herein as the printer assemblies 16*a*—16*b*—operating on opposing sides of the CAT 10. Unless noted otherwise, the printer assemblies 16*a* and 16*b* both include substantially all of the same components. FIGS. 8A, 8B and 9A-9C depict the components of the printer assembly 16*a,* which is described in detail hereinafter. The description of the printer assembly 16*a* applies as well to the opposing printer assembly 16*b*.

Figure 9A:
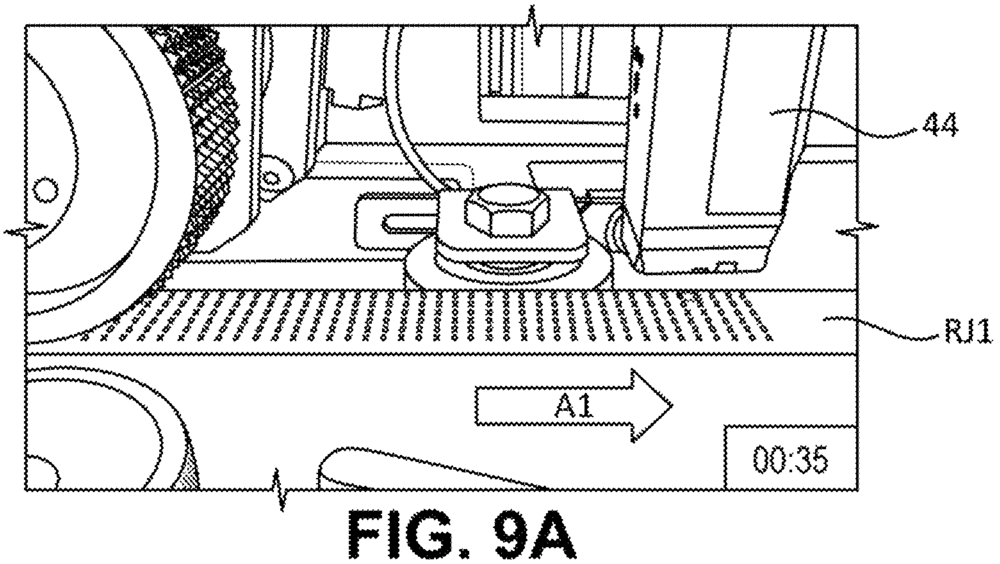
FIGS. 9A, 9B and 9C depict the printer system in operation according to an embodiment of the invention.
Figure 9B:
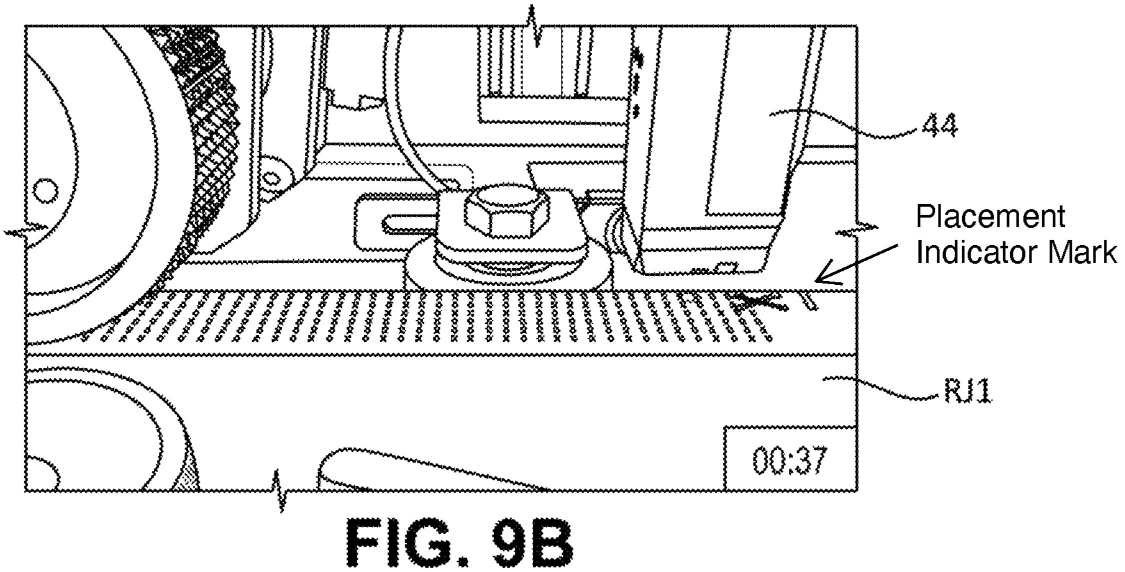
Figure 9C:
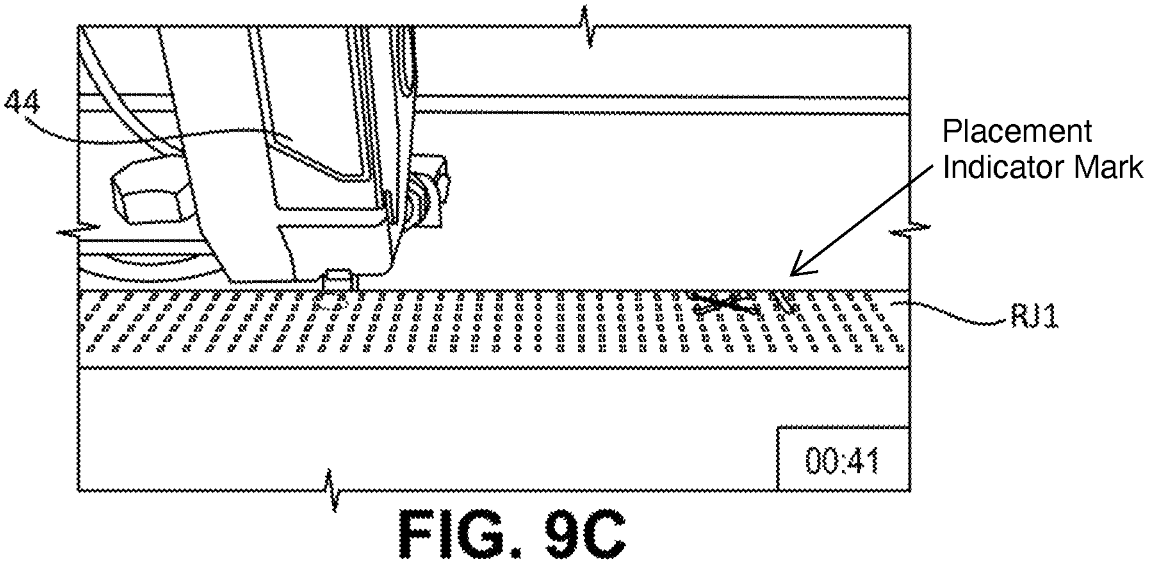

The preferred embodiment of the printer assembly 16*a* includes an ink jet printer 44 attached to a motor-driven vertical transport carriage 46. The controller 28 controls the carriage 46 to move the printer 44 down or up to the appropriate height above the top surface of the perimeter rail as determined by the floor plan loaded into the controller 28. Once the leading edge detection sensor 50 has detected the leading edge of the perimeter rail, the controller 28 controls the printer 44 to print a placement indicator mark on the top surface of the perimeter rail as it moves beneath the printer 44. An example of a placement indicator mark is shown in FIGS. 9A, 9B and 9C. These indicator marks are printed at predetermined spacings (such as 16 inches) as determined by a count value from the main encoders 96 and the floor plan loaded into the controller 28. As described in more detail hereinafter, each placement indicator mark will be used in a later step of the process to locate the position at which the end of a corresponding floor joist board is to be attached.

Floor Joist Board Transport System

Figure 10A:
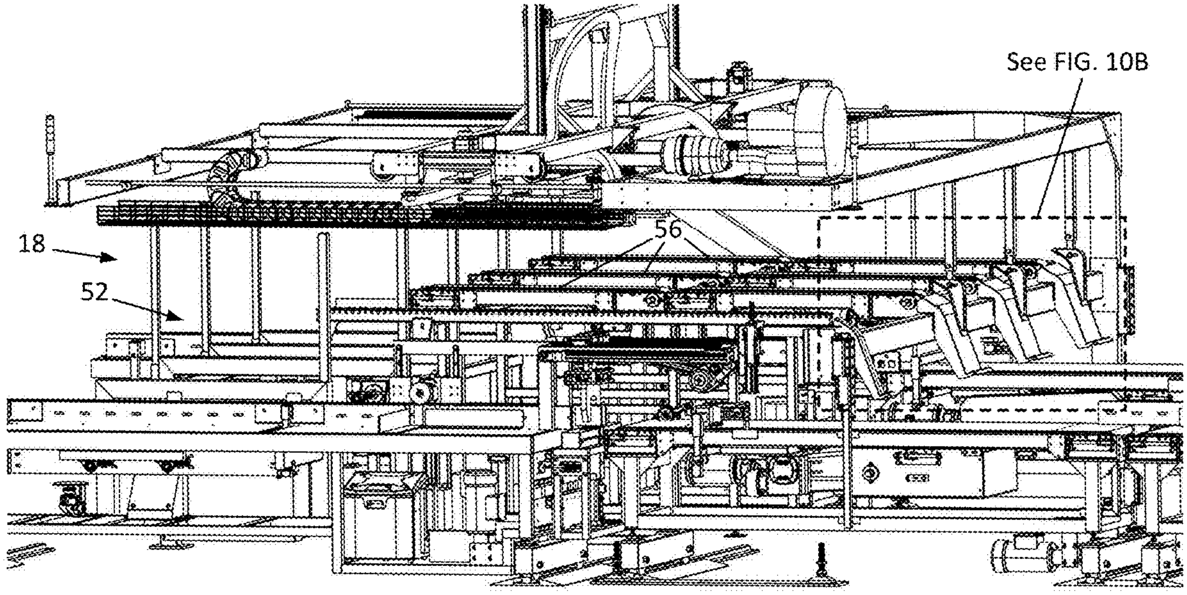
FIGS. 10A and 10B depict a floor joist board delivery system of the apparatus of FIG. 1 according to an embodiment of the invention.
Figure 10B:
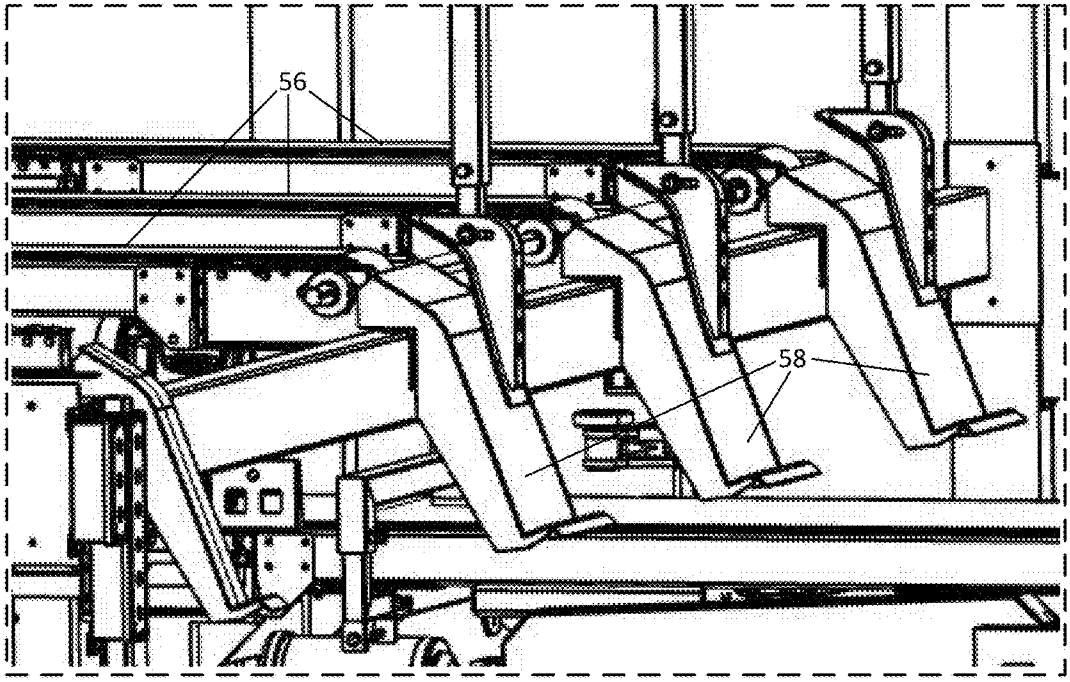
Figure 11A:
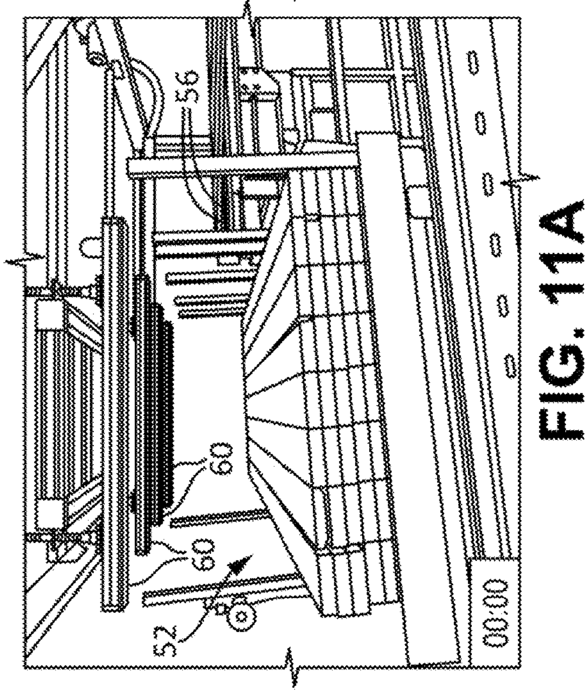
FIGS. 11A, 11B, 11C and 11D depict the floor joist board delivery system in operation according to an embodiment of the invention.

FIGS. 10A, 10B, 11A-11D and 12A-12F depict a preferred embodiment of the floor joist board transport system 18. The floor joist board transport system 18 includes a floor joist board supply rack 52, a vacuum transport gantry 54, a vacuum pump 88, several vacuum lifts 60, gantry motors 78, gantry detection sensors 82, floor joist conveyors 56, floor joist conveyor motors 80, floor joist conveyor detection sensors 84, a floor joist chute 58, and floor joist chute detection sensors 86. As shown in FIGS. 10A and 11A, the floor joist board supply rack 52 accommodates a bundle of floor joist boards that are loaded by a fork truck for use in the assembly process. The supply rack 52 is disposed below the vacuum transport gantry 54 from which the vacuum lifts 60 are suspended. As described in more detail below, the gantry 54 and lifts 60 are used in the floor assembly process to lift floor joist boards from the bundle and deliver them to the joist conveyers 56.

The gantry detection sensors 82 are attached to the gantry 54 in positions in which they can detect the presence of floor joist boards that have been lifted by the vacuum lifts 60.

Figure 11B:
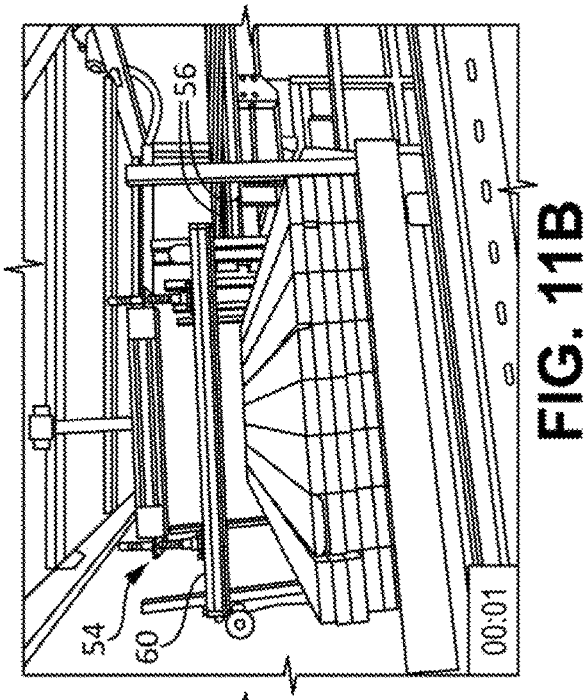
Figure 11C:
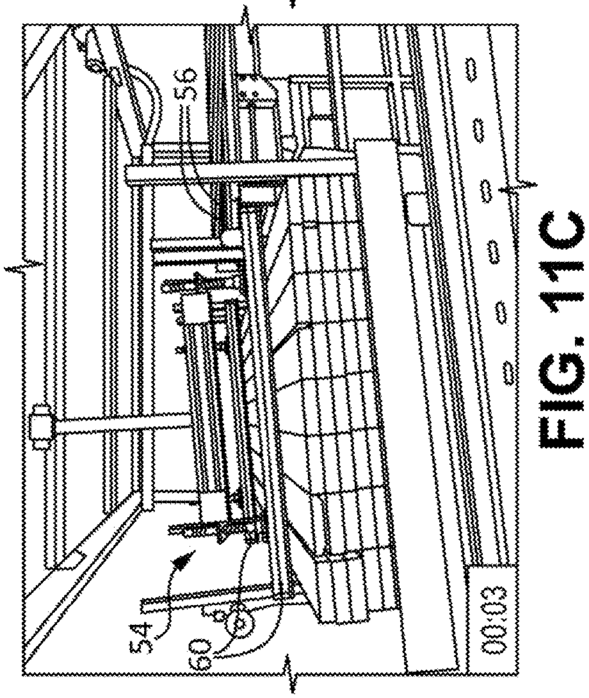
Figure 11D:
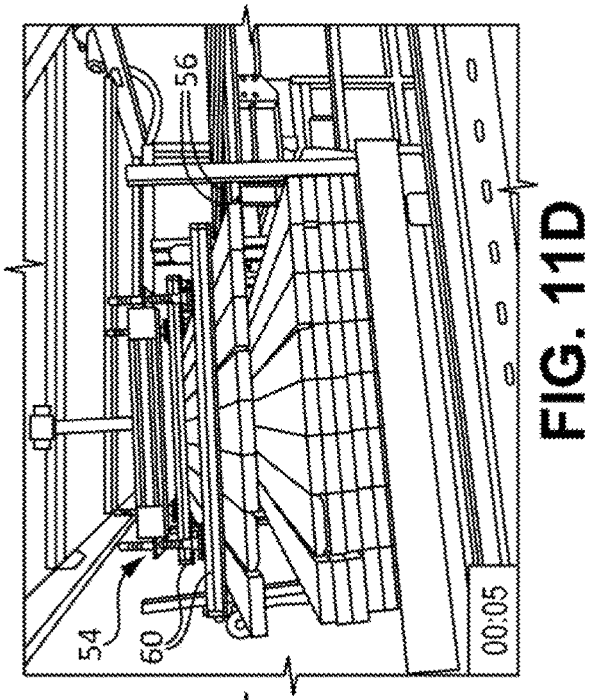

After the controller 28 has started the vacuum pump 88, the controller 28 receives sensor signals from the gantry detection sensors 82 indicating whether any floor joist boards are engaged with the vacuum lifts 60. If no joists are detected on the lifts 60, the controller 28 controls the gantry motors 78 to horizontally translate the gantry 54 into a loading position above the rack 52 (as shown in FIG. 11A) and then to lower the vacuum lifts 60 downward to engage the top layer of up to nine joists in the bundle (as shown in FIGS. 11B and 11C). The controller 28 then controls the gantry motors 78 to lift the top layer of joists (as shown in FIG. 11D) and horizontally translate the gantry 54 into position above an unloading area on the floor joist conveyors 56. The controller 28 receives sensor signals from the floor joist conveyor detection sensors 84 indicating whether any floor joist boards are on the conveyors 56 in the unloading area. If no joists are on the conveyors 56 in the unloading area, then the controller 28 controls the gantry motors 78 to lower the vacuum lifts 60 downward until the joists contact the conveyors, and controls the vacuum pressure to release the joists onto the conveyors 56. If joists are detected on the conveyors 56 in the unloading area, then the controller 28 controls the gantry motors 78 to hold position until no joists are detected in the unloading area. This process continuously repeats to load and unload the next layers of joists from the bundle.

The conveyors 56 transport the joists from the unloading area toward the floor joist chute 58 while keeping the side-by-side joists spaced apart. As shown in FIGS. 10A and 10B, the floor joist chute 58 disposed at the forward end of the conveyors 56 receives the joists one at a time as they are delivered by the conveyors 56. One or more floor joist chute detection sensors 86 attached to the floor joist chute 58 generate sensor signals indicating whether a joist is present in the chute 58. If no joist is detected in the chute 58, the controller 28 controls the conveyor motors 80 to run, and if a joist is detected in the chute 58, the controller 28 controls the conveyor motors 80 to stop.

Joist Nailing Operator Station

Figure 12A:
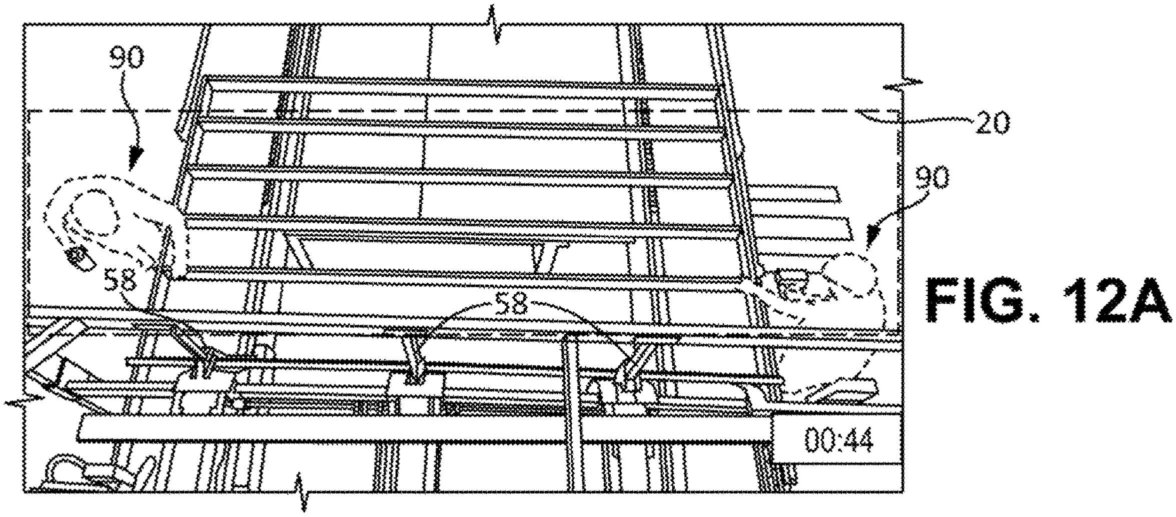
FIGS. 12A, 12B and 12C depict a joist nailing operator station of the apparatus of FIG. 1 and operations therein according to an embodiment of the invention.
Figure 12B:
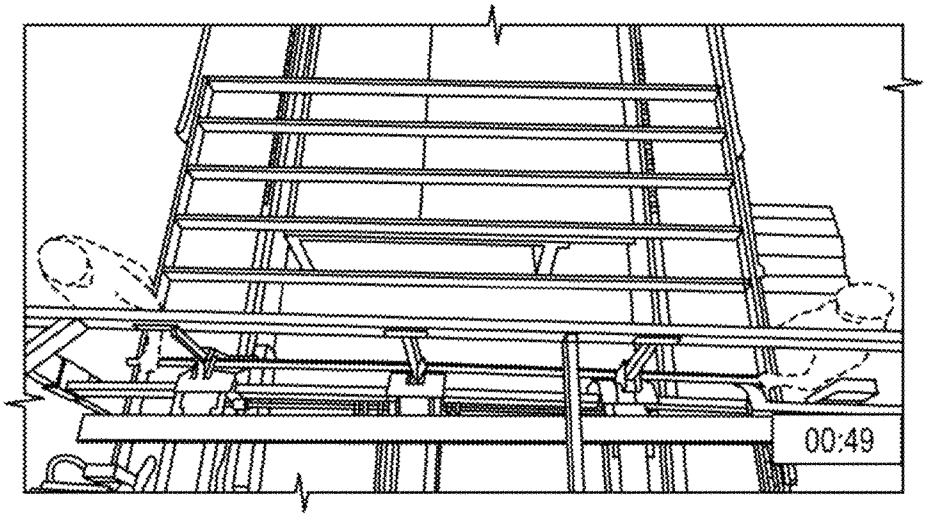
Figure 12C:
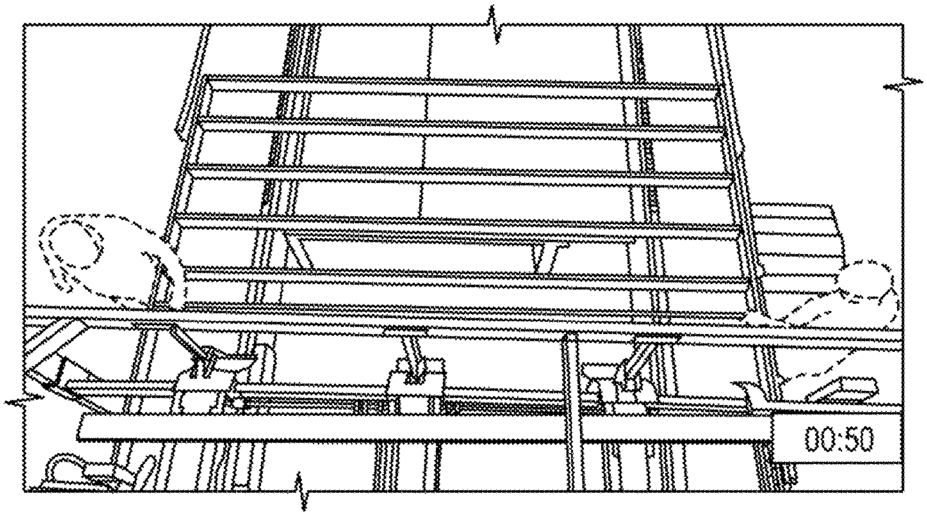
Figure 13A:
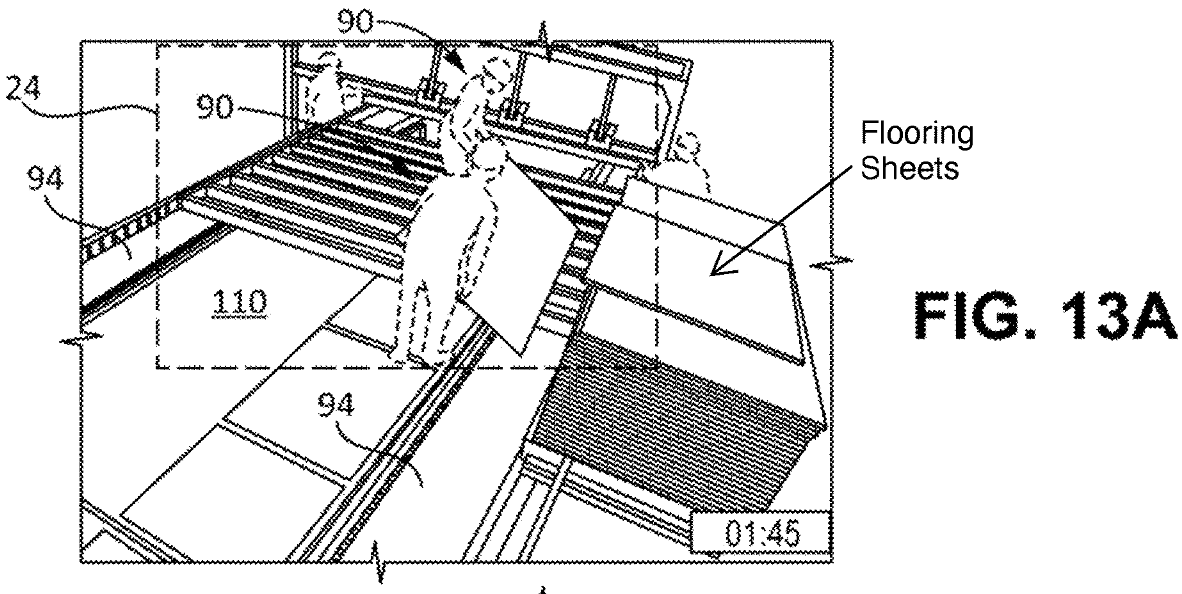
FIGS. 13A, 13B, 13C, 13D, 13E and 13F depict a floor decking operator station of the apparatus of FIG. 1 and operations therein according to an embodiment of the invention.
Figure 13B:
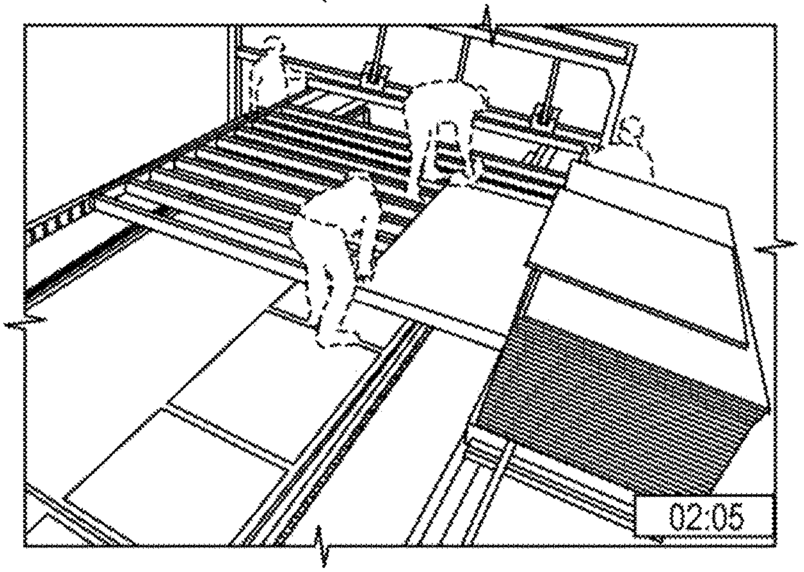
Figure 13C:
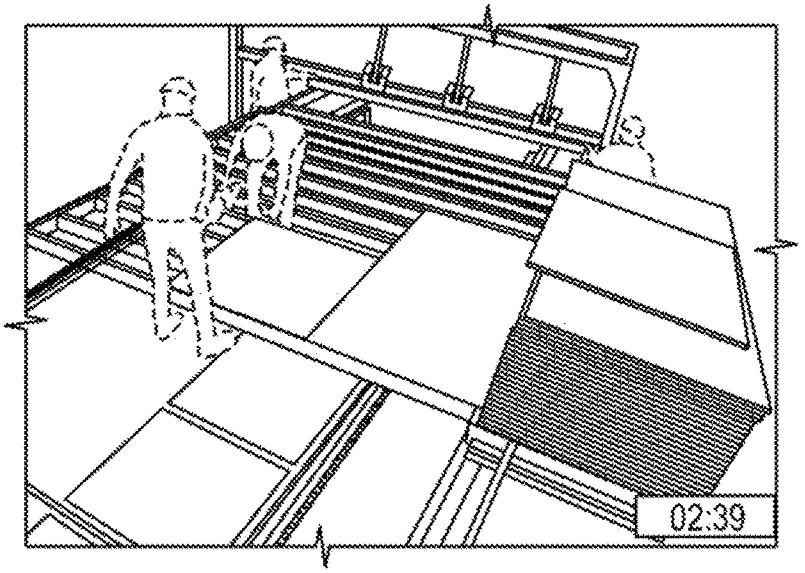
Figure 13D:
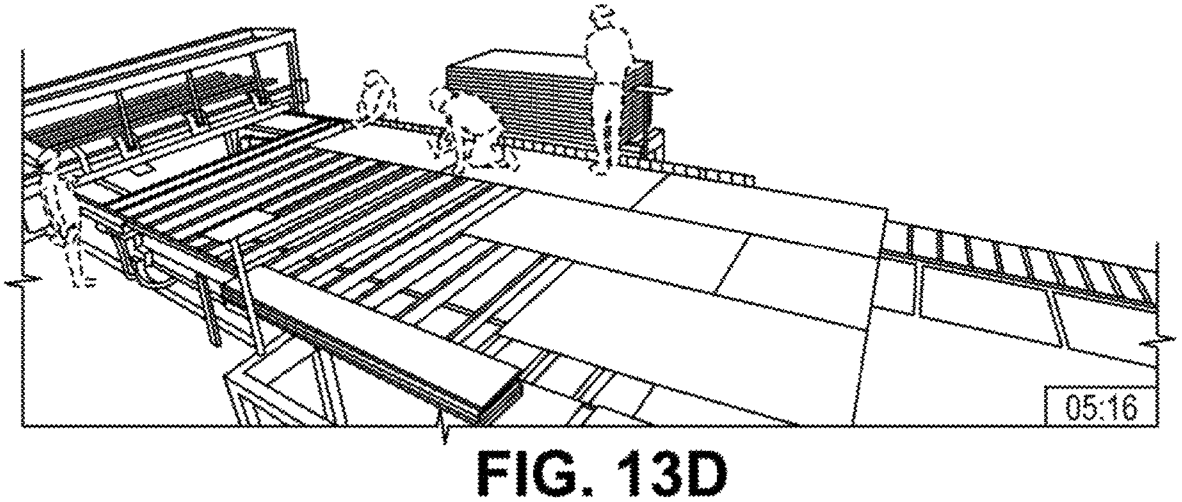
Figure 13E:
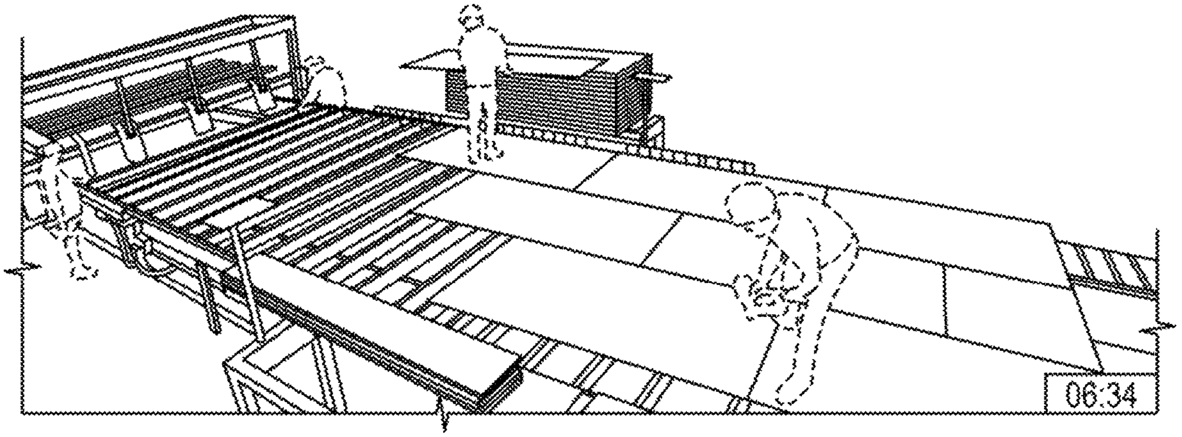
Figure 13F:
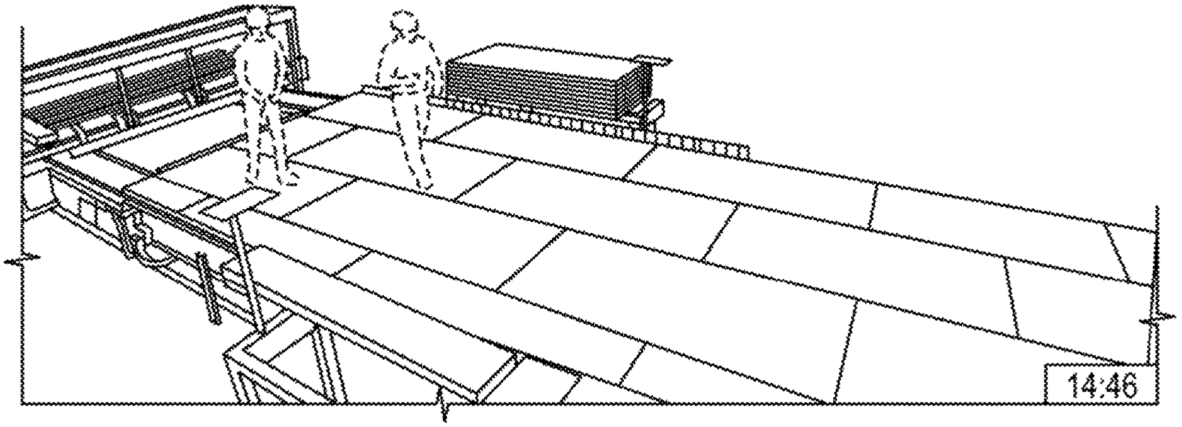
Figure 15:
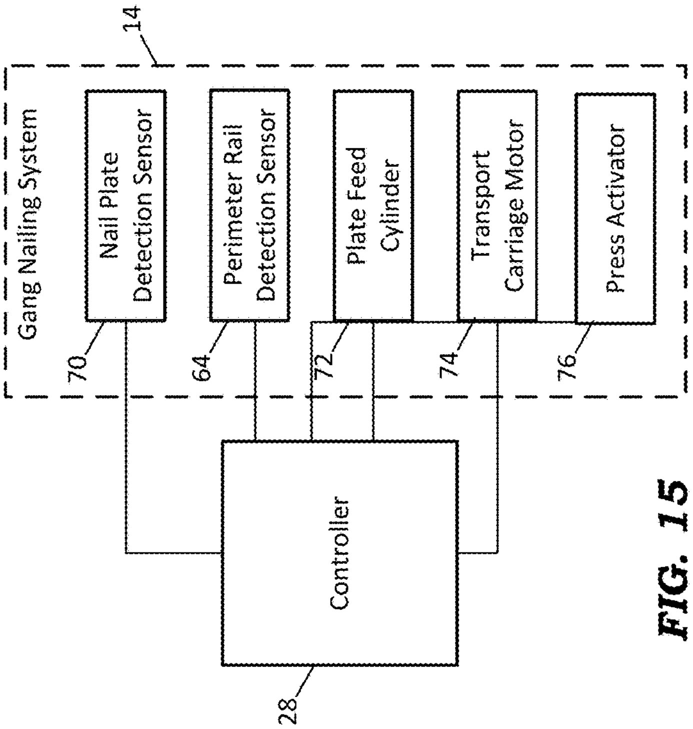
FIG. 15 depicts a functional block diagram of the gang nailing system according to an embodiment of the invention.
Figure 14:
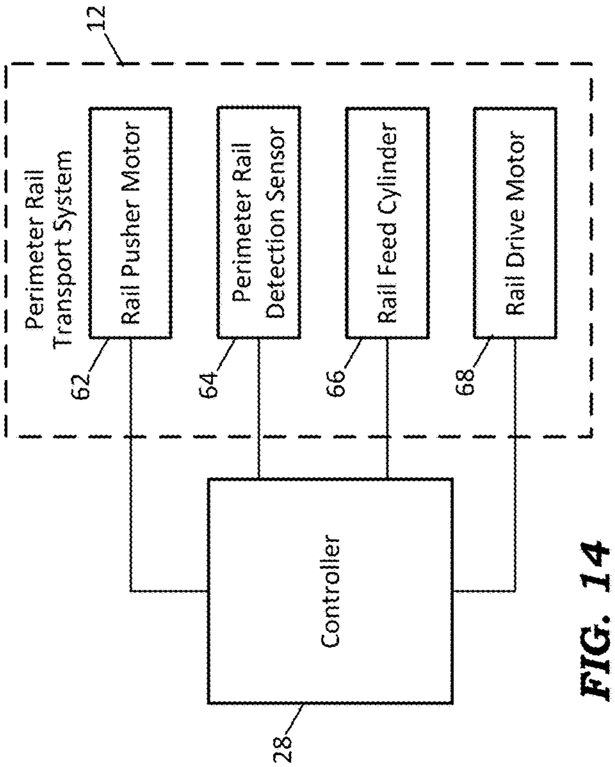
FIG. 14 depicts a functional block diagram of the perimeter rail transport system according to an embodiment of the invention.
Figure 16:
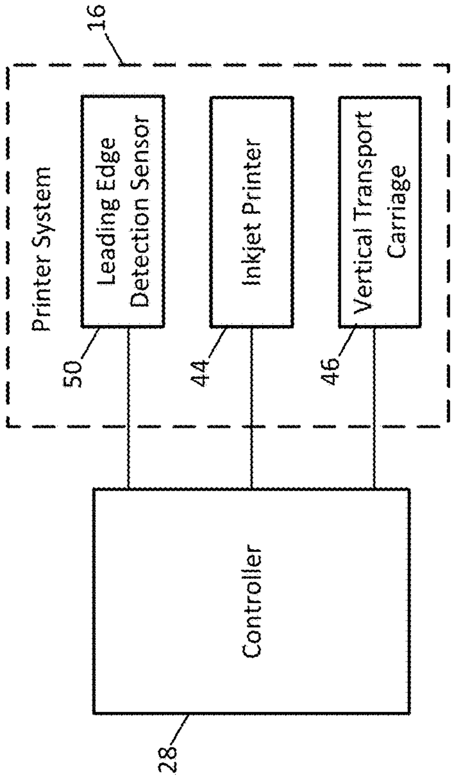
FIG. 16 depicts a functional block diagram of the printer system according to an embodiment of the invention.
Figure 17:
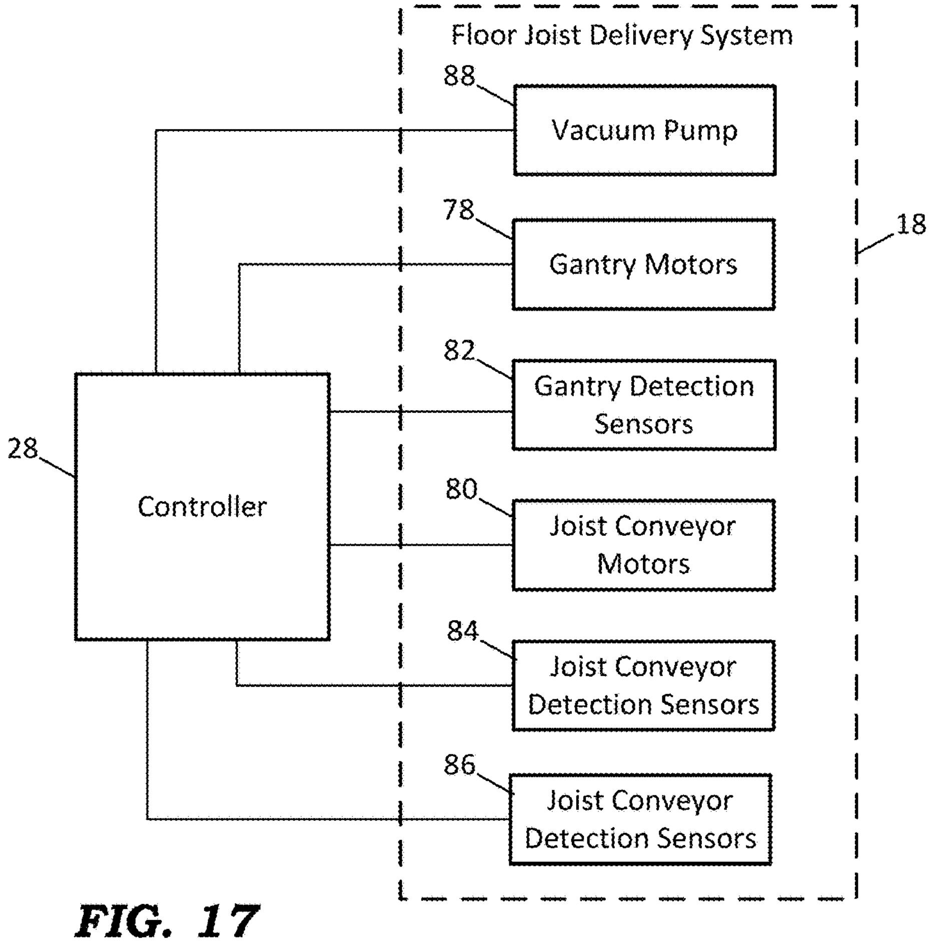
FIG. 17 depicts a functional block diagram of the floor joist board delivery system according to an embodiment of the invention.

FIGS. 12A-12C depict the joist nailing operator station 20 in which two operators 90—one on either side of the floor joist chute 58—transfer floor joist boards from the chute 58 into position between the perimeter rails and attach the joists at locations indicated by the placement indicator marks. In preferred embodiments, the joists are attached by nails that are pneumatically driven through the perimeter rails into the ends of the joists. The operators 90 continuously perform this operation as the perimeter rails are continuously translated down the table, and the floor joist boards are continuously deposited into the floor joist chute 58.

Floor Assembly Transport and Squaring System

Figure 18:
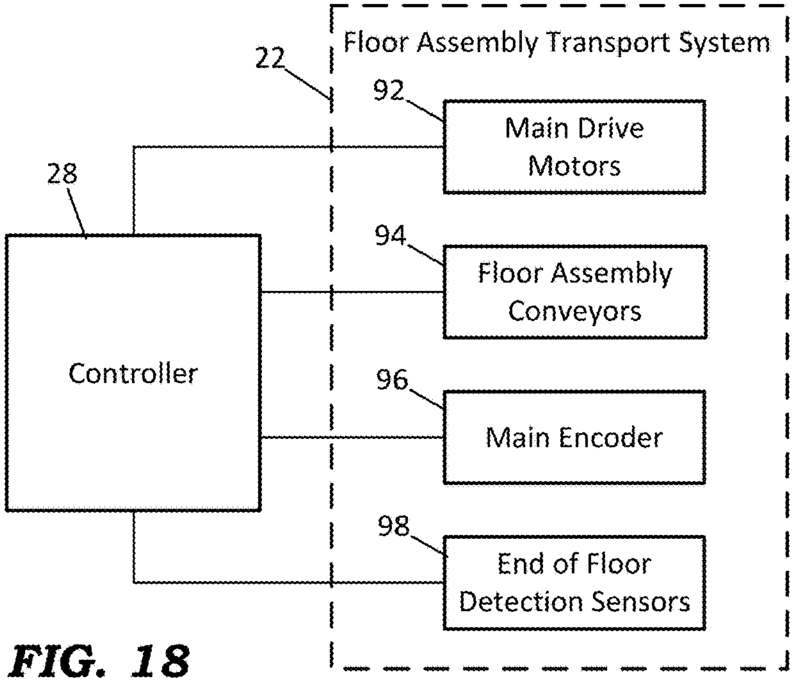
FIG. 18 depicts a functional block diagram of the floor assembly transport system according to an embodiment of the invention.

As shown in FIG. 18, the floor assembly transport system 22 comprises the main drive motors 92 and floor assembly conveyors 94 that continuously move the floor assembly down the length of the CAT 10. This system 22 also includes the main encoders 96 and the end of floor detection sensors 98. In a preferred embodiment, the main drive motors 92 and floor assembly conveyors 94 begin running at the beginning of the build process and run continuously until the finished end of the floor assembly is detected by the end of floor detection sensors 98.

Figure 21:
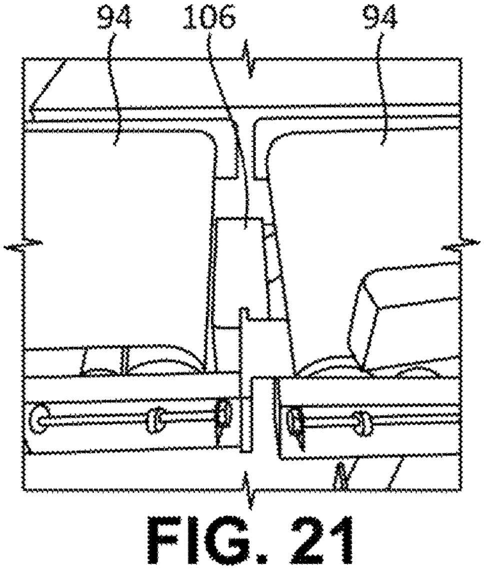
FIG. 21 depicts a pneumatically-operated stop of a floor squaring system according to an embodiment of the invention.

In a preferred embodiment, before the proceeding with the floor decking process, an operator presses a push button to begin an initial squaring routine. As depicted in FIG. 21, this routine activates two pneumatically operated stops 106 that are situated below and in a gap between the floor assembly conveyors 94 on either side of the CAT 10. After the stops 106 are raised, the conveyors 94 move the partially framed floor against the stops, thereby ensuring that the floor assembly is square before proceeding with application of floor decking. Initial pieces of decking are then attached as described hereinafter, which hold the floor assembly in the squared position for the remainder of the building process.

After running the initial squaring routine, an auto-squaring routine running on the controller 28 controls the main drive motors 92 and conveyors 94 to perform an automatic routine to continuously keep the assembly square. That automatic routine receives counts from the main encoders 96 that monitor the positions of the perimeter rails on opposing sides of the CAT 10. If the encoder counts are not equal, the controller 28 causes the main drive motor 92 and conveyor 94 on the leading side (higher encoder count) to stop until the count on the other side catches up. This squaring procedure, which is preferably performed at about 12-inch intervals, ensures that the floor assembly stays square as it is transported down the table.

Floor Decking Operator Station

FIGS. 13A-13F depict the floor decking operator station 24 in which operators 90 transfer flooring sheets from a stack adjacent the CAT 10 into position on top of the floor joist boards and perimeter rails. Although the operators in FIGS. 13A-13F are shown attaching the flooring sheets using pneumatic nail guns, it will be appreciated that the sheets may also be attached using glue, or a combination of glue and nails. The floor decking operator station 24 includes a variable width platform 110 situated between the conveyors 94 on which the operators 90 can stand

Floor Width and Height Adjustment

Figure 19:
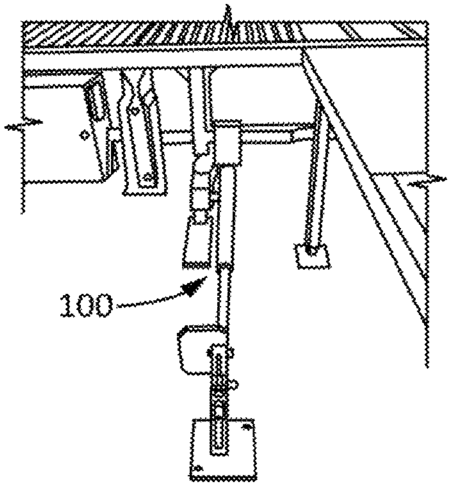
FIG. 19 depicts a motor driven cylinder of a floor width adjustment system according to an embodiment of the invention.
Figure 20A:
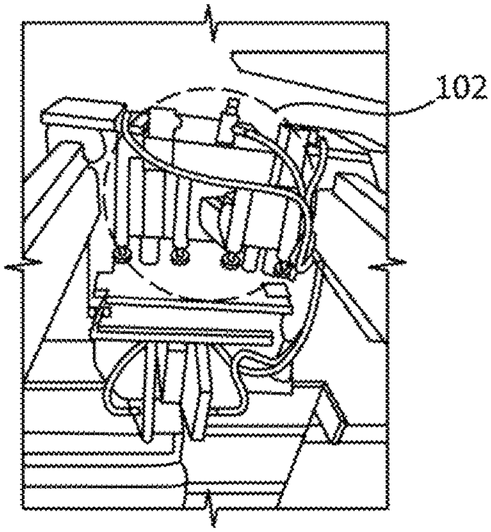
FIGS. 20A and 20B depict pneumatic cylinders of a floor height adjustment system according to an embodiment of the invention.
Figure 20B:
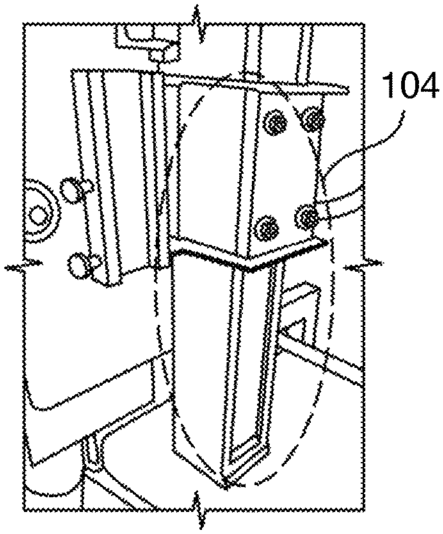

As depicted in FIG. 19, one side of the table can be translated horizontally by motor driven cylinders 100 to adjust for floors of various widths. In a preferred embodiment, the table can accommodate floors ranging in width from 12 feet to 16 feet.

As depicted in FIGS. 20A and 20B, various components can be adjusted vertically to different heights using pneumatic cylinders 102 and 104. This allows for assembly of floors using nominal 2×6 inch, 2×8 inch, or other height floor joist boards and rim joists.

Floor Lifting System

Figure 22:
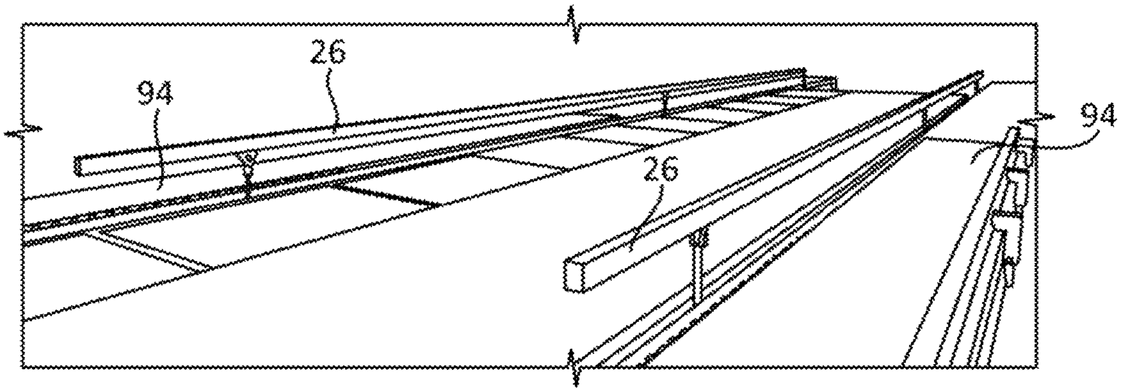
FIG. 22 depicts a pneumatically-operated lifting system according to an embodiment of the invention.

As shown in FIG. 22, situated inside the conveyors 94 is a pneumatically-operated lifting system 26 that lifts the completed floor assembly to facilitate picking with lifting beams for transport away from the CAT 10.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for use in assembling a floor of a manufactured building as the floor moves in a first direction, wherein the floor is assembled using rim joist boards and floor joist boards, the apparatus comprising:
 a perimeter rail transport system comprising:
  a first perimeter rail transporter configured to receive a first set of the rim joist boards, to abut the rim joist boards of the first set together in an end-to-end configuration, and to transport the first set of rim joist boards in the first direction; and
  a second perimeter rail transporter configured to receive a second set of the rim joist boards, to abut the rim joist boards of the second set together in an end-to-end configuration, and to transport the second set of rim joist boards in the first direction,
  wherein the first set of rim joist boards is disposed in parallel to the second set of rim joist boards, and the first set of rim joist boards is spaced apart from the second set of rim joist boards;
 a gang nailing system comprising:
  a first gang nailer configured to receive the first set of rim joist boards as they move in the first direction and to drive gang nail plates into the first set of rim joist boards in locations at which the first set of rim joist boards are abutted together, thereby attaching the first set of rim joist boards together to form a first perimeter rail; and
  a second gang nailer configured to receive the second set of rim joist boards as they move in the first direction and to drive gang nail plates into the second set of rim joist boards in locations at which the second set of rim joist boards are abutted together, thereby attaching the second set of rim joist boards together to form a second perimeter rail;
 a printer system configured to receive the first and second perimeter rails, the printer system comprising:
  a first printer assembly configured to print location indicator markings on the first perimeter rail, wherein the location indicator markings on the first perimeter rail are separated by predetermined spacings from adjacent location indicator markings on the first perimeter rail; and
  a second printer assembly configured to print location indicator markings on the second perimeter rail, wherein the location indicator markings on the second perimeter rail separated by predetermined spacings from adjacent location indicator markings on the second perimeter rail;
 a floor joist board transport system configured to transport a plurality of floor joist boards in the first direction, wherein the floor joist boards are disposed side-by-side and oriented lengthwise in a second direction that is substantially perpendicular to the first direction;
 a floor joist board attachment operator station that receives the floor joist boards and the first and second perimeter rails, the floor joist board attachment operator station comprising:
  a first fastener insertion tool for inserting fasteners to attach first ends of the floor joist boards to the first perimeter rail;
  a second fastener insertion tool for inserting fasteners to attach second ends of the floor joist boards to the second perimeter rail;
  a first area for accommodating a first fastener operator as the first fastener operator uses the first fastener insertion tool to insert the fasteners to attach the first ends of the floor joist boards orthogonally to the first perimeter rail in locations indicated by the location indicator markings printed on the first perimeter rail, wherein the first area is adjacent to the first perimeter rail and the first ends of the floor joist boards as they are delivered by the one or more conveyors to the floor joist board attachment operator station; and
  a second area for accommodating a second fastener operator as the second fastener operator uses the second fastener insertion tool to insert the fasteners to attach the second ends of the floor joist boards orthogonally to the second perimeter rail in locations indicated by the location indicator markings printed on the second perimeter rail, wherein the second area is adjacent to the second perimeter rail and the second ends of the floor joist boards as they are delivered by the one or more conveyors to the floor joist board attachment operator station; and
 a floor decking operator station that receives the first and second perimeter rails with the floor joist boards attached therebetween, the floor decking operator station comprising a third area for accommodating one or more decking operators as they attach flooring sheets in a predetermined pattern to upper surfaces of the first and second perimeter rails and to the floor joist boards attached therebetween; and
 a controller that executes instructions to control one or more of the perimeter rail transport system, the gang nailing system, the printer system, and the floor joist board transport system.

2. The apparatus of claim 1 wherein:
 the first perimeter rail transporter includes:
  a first roller bracket aligned in the first direction;
  a second roller bracket aligned in parallel with the first roller bracket;
  one or more first arms attached to the second roller bracket;
  a first pusher motor for driving the one or more first arms to cause the second roller bracket to move toward or away from the first roller bracket in the second direction, thereby controlling the width of a first space between the first and second roller brackets, wherein the first space receives the first set of the rim joist boards;
  a first roller disposed above the first space, the first roller operable to translate downward to engage a rim joist board in the first space; and
  a first rail drive motor connected to the first roller to cause the first roller to rotate, wherein rotation of the first roller when engaged with the rim joist board causes the rim joist board to move in the first direction between the first and second roller brackets; and
 the second perimeter rail transporter includes:
  a third roller bracket aligned in the first direction;
  a fourth roller bracket aligned in parallel with the third roller bracket;
  one or more second arms attached to the fourth roller bracket;
  a second pusher motor for driving the one or more second arms to cause the fourth roller bracket to move toward or away from the third roller bracket in the second direction, thereby controlling the width of a second space between the third and fourth roller brackets, wherein the second space receives the second set of the rim joist boards;

a second roller disposed above the second space, the second roller operable to translate downward to engage a rim joist board in the second space; and a second rail drive motor connected to the second roller to cause the second roller to rotate, wherein rotation of the second roller when engaged with the rim joist board causes the rim joist board to move in the first direction between the third and fourth roller brackets.

3. The apparatus of claim 2 wherein the perimeter rail transport system further comprises:

a first perimeter rail detection sensor that generates a first perimeter rail detection sensor signal indicating whether a rim joist board is detected beneath the first roller; and a second perimeter rail detection sensor that generates a second perimeter rail detection sensor signal indicating whether a rim joist board is detected beneath the second roller, wherein the controller is further operable to:

receive the first perimeter rail detection sensor signal indicating that no rim joist board is detected beneath the first roller, and generate a first pusher motor control signal based thereon to cause the first pusher motor to drive the one or more first arms to cause the second roller bracket to push a rim joist board in the first space against the first roller bracket and beneath the first roller;

receive the first perimeter rail detection sensor signal indicating that a rim joist is detected beneath the first roller, and generate a first roller control signal based thereon to cause the first roller to translate downward to engage the rim joist board detected beneath the first roller, thereby causing the rim joist board to move in the first direction;

receive the second perimeter rail detection sensor signal indicating that no rim joist board is detected beneath the second roller, and generate a second pusher motor control signal based thereon to cause the second pusher motor to drive the one or more second arms to cause the fourth roller bracket to push a rim joist board in the second space against the third roller bracket and beneath the second roller; and receive the second perimeter rail detection sensor signal indicating that a rim joist board is detected beneath the second roller, and generate a second roller control signal based thereon to cause the second roller to translate downward to engage the rim joist board detected beneath the second roller, thereby causing the rim joist board to move in the first direction.

4. The apparatus of claim 3 further comprising:

a first main encoder that generates first pulses used in monitoring positions of the rim joist boards from the first set as the rim joist boards move in the first direction; and a second main encoder that generates second pulses used in monitoring positions of the rim joist boards from the second set as the rim joist boards move in the first direction, wherein the controller is further operable to:

receive the first perimeter rail detection sensor signal indicating that a trailing edge of a rim joist board has passed beneath the first perimeter rail detection sensor;

receive the second perimeter rail detection sensor signal indicating that a trailing edge of a rim joist board has passed beneath the second perimeter rail detection sensor;

count the first pulses from the first main encoder received after the trailing edge of the rim joist board from the first set has passed beneath the first perimeter rail detection sensor;

based on counting a first predetermined number of first pulses, control the first roller to move upward, and generate a first pusher motor control signal to cause the first pusher motor to drive the one or more first arms to cause the second roller bracket to push another rim joist board from the first set against the first roller bracket and beneath the first roller;

count the second pulses from the second main encoder received after the trailing edge of the rim joist board from the second set has passed beneath the second perimeter rail detection sensor; and based on counting a first predetermined number of second pulses, control the second roller to move upward, and generate a second pusher motor control signal to cause the second pusher motor to drive the one or more second arms to cause the fourth roller bracket to push another rim joist board from the second set against the third roller bracket and beneath the second roller.

5. The apparatus of claim 4 wherein the gang nailing system comprises:

a first horizontal transport carriage aligned in the first direction;

a first transport carriage motor configured to drive the first horizontal transport carriage;

a second horizontal transport carriage aligned in the first direction;

a second transport carriage motor configured to drive the second horizontal transport carriage;

the first gang nailer including a first gang nail press suspended below the first horizontal transport carriage;

the second gang nailer including a second gang nail press suspended below the second horizontal transport carriage, wherein the controller is further operable to:

based on counting a first predetermined number of first pulses from the first main encoder, control the first transport carriage motor to move the first transport carriage with the first gang nail press in the first direction at the same speed at which two abutted rim joist boards from the first set are moving, so that an abutment point between the two abutted rim joist boards remains centered between two opposing plates of the first gang nail press;

based on counting a second predetermined number of second pulses from the second main encoder, control the second transport carriage motor to move the second transport carriage with the second gang nail press in the first direction at the same speed at which two abutted rim joist boards from the second set are moving, so that an abutment point between the two abutted rim joist boards remains centered between two opposing plates of the second gang nail press;

while the first gang nail press moves in the first direction at the same speed at which the two abutted rim joist boards from the first set are moving, control a first press activator to cause the opposing plates of the first press to clamp down against the two abutted rim joist boards from the first set and drive in gang nails on either side thereof to form a portion of the first perimeter rail; and while the second gang nail press moves in the first direction at the same speed at which the two abutted rim joist boards from the second set are moving, control a second press activator to cause the opposing plates of the second press to clamp down against the two abutted rim joist boards from the second set and drive in gang nails on either side thereof to form a portion of the second perimeter rail.

6. The apparatus of claim 5 further comprising:

the first printer assembly including:

a first vertical transport carriage;

a first ink jet printer attached to the first vertical transport carriage; and a first leading edge detection sensor operable to detect a leading edge of the first perimeter rail and generate a first leading edge sensor signal based thereon; and the second printer assembly including:

a second vertical transport carriage;

a second ink jet printer attached to the second vertical transport carriage; and a second leading edge detection sensor operable to detect a leading edge of the second perimeter rail and generate a second leading edge sensor signal based thereon, wherein the controller is further operable to:

receive the first leading edge sensor signal indicating detection of the leading edge of the first perimeter rail;

receive the second leading edge sensor signal indicating detection of the leading edge of the second perimeter rail;

control the first vertical transport carriage to move the first ink jet printer to an appropriate height above a top surface of the first perimeter rail;

control the second vertical transport carriage to move the second ink jet printer to an appropriate height above a top surface of the second perimeter rail;

based on the first leading edge sensor signal and the first pulses from the first main encoder, control the first ink jet printer to print location indicator markings on the top surface of the first perimeter rail at the predetermined spacings as it moves in the first direction beneath the first ink jet printer; and based on the second leading edge sensor signal and the second pulses from the second main encoder, control the second ink jet printer to print location indicator markings on the top surface of the second perimeter rail at the predetermined spacings as it moves in the first direction beneath the second ink jet printer.

7. The apparatus of claim 1 wherein the floor joist board transport system further comprises:

a floor joist board supply rack configured to accommodate a bundle of floor joist boards;

a vacuum transport gantry disposed above the floor joist board supply rack;

one or more vacuum lifts suspended from the vacuum transport gantry, the one or more vacuum lifts configured to lift floor joist boards from the floor joist board supply rack;

a vacuum pump configured to provide a vacuum to the one or more vacuum lifts;

one or more gantry detection sensors attached to the vacuum transport gantry, the one or more gantry detection sensors configured to detect floor joist boards that have been lifted by the one or more vacuum lifts;

one or more gantry motors configured to move the gantry;

one or more floor joist conveyors configured to receive floor joist boards from the one or more vacuum lifts and transport the floor joist boards in the first direction, the one or more floor joist conveyors having an unloading area configured to receive the floor joist boards in a side-by-side arrangement, with each of the floor joist boards oriented lengthwise in the second direction;

one or more floor joist conveyor motors configured to drive the one or more floor joist conveyors;

one or more floor joist conveyor detection sensors configured to detect floor joist boards in the unloading area on the one or more floor joist conveyors;

a floor joist chute disposed at a forward end of the one or more floor joist conveyors, the floor joist chute configured to sequentially receive the floor joist boards one at a time as they are moved in the first direction by the one or more floor joist conveyors; and one or more floor joist chute detection sensors attached to the floor joist chute that generate one or more sensor signals indicating whether a floor joist board is present in the floor joist chute, wherein the controller is further operable to:

receive sensor signals from the one or more gantry detection sensors indicating whether any floor joist boards are engaged with the one or more vacuum lifts;

based on detecting no floor joist boards engaged with the one or more vacuum lifts, control the one or more gantry motors to horizontally translate the vacuum transport gantry into a loading position above the floor joist board supply rack, and control the one or more gantry motors to lower the one or more vacuum lifts downward to engage a top layer of the floor joist boards in the bundle;

control the one or more gantry motors to lift the one or more vacuum lifts with the top layer of floor joist boards attached thereto and horizontally translate the vacuum transport gantry into a position above the unloading area of the one or more floor joist conveyors;

receive sensor signals from the one or more floor joist conveyor detection sensors indicating whether floor joist boards are present in the unloading area of the one or more floor joist conveyors;

based on detecting no floor joist boards in the unloading area, control the one or more gantry motors to lower the one or more vacuum lifts downward until the floor joist boards contact the one or more floor joist conveyors, and control the vacuum pump to release the vacuum to deposit the floor joist boards onto the unloading area;

based on detecting one or more floor joist boards in the unloading area, control the one or more gantry motors to hold position until no floor joist boards are detected in the unloading area;

based on detecting no floor joist boards in the floor joist chute, control the one or more floor joist conveyor motors to drive the one or more floor joist conveyors to deposit a floor joist board into the floor joist chute; and based on detecting a floor joist board in the floor joist chute, control the one or more floor joist conveyor motors to stop driving the one or more floor joist conveyors.

* * * * *